(12) United States Patent
Ono et al.

(10) Patent No.: US 9,869,815 B2
(45) Date of Patent: Jan. 16, 2018

(54) OPTICAL DEVICE HAVING A STEPWISE OR TAPERED LIGHT INPUT/OUTPUT PART AND MANUFACTURING METHOD THEREFOR

(71) Applicants: Oki Electric Industry Co., Ltd., Tokyo (JP); National Institute Of Advanced Industrial Science And Technology, Tokyo (JP); Photonics Electronics Technology Research Association, Tokyo (JP)

(72) Inventors: Hideki Ono, Tokyo (JP); Tsuyoshi Horikawa, Ibaraki (JP); Naoki Hirayama, Ibaraki (JP)

(73) Assignees: Oki Electric Industry Co., Ltd., Tokyo (JP); National Institute of Advanced Industrial Science and Technology, Tokyo (JP); Photonics Electronics Technology Research Association, Tokyo (JP)

( * ) Notice: Subject to any disclaimer, the term of this patent is extended or adjusted under 35 U.S.C. 154(b) by 0 days.

(21) Appl. No.: 15/093,833

(22) Filed: Apr. 8, 2016

(65) Prior Publication Data

US 2016/0223748 A1    Aug. 4, 2016

Related U.S. Application Data

(62) Division of application No. 14/482,616, filed on Sep. 10, 2014, now Pat. No. 9,335,475.

(30) Foreign Application Priority Data

Sep. 20, 2013 (JP) .................................. 2013-196083
Jun. 17, 2014 (JP) .................................. 2014-124662

(51) Int. Cl.
*G02B 6/12* (2006.01)
*G02B 6/122* (2006.01)
(Continued)

(52) U.S. Cl.
CPC ....... *G02B 6/1228* (2013.01); *G02B 6/12002* (2013.01); *G02B 6/124* (2013.01);
(Continued)

(58) Field of Classification Search
CPC .. G02B 6/1228; G02B 6/12002; G02B 6/124; G02B 6/126; G02B 6/136; G02B 6/305;
(Continued)

(56) References Cited

U.S. PATENT DOCUMENTS 4,296,387 A * 10/1981 Sugino .................. H01S 5/2238
257/201
4,380,861 A *  4/1983 Sugino .................. H01S 5/2238
438/41
(Continued)

FOREIGN PATENT DOCUMENTS

CA    2349031 A1    11/2002
CA    2349031 A1 *  11/2002 ........... G02B 6/1228
(Continued)

*Primary Examiner* — Peter Radkowski
(74) *Attorney, Agent, or Firm* — Rabin & Berdo, P.C.

(57) ABSTRACT

An optical device includes an optical waveguide provided on a principal surface of a substrate. The optical waveguide includes a core and a cladding provided around the core. The cladding is configured by a substance having a refractive index smaller than 71.4% of the refractive index of the core. The core has constituent atoms substantially forming a diamond lattice structure. The optical waveguide has a light input/output part through which a light beam is input and/or output. The light input/output part decreases stepwise in thickness towards an output end while tapering down in its width. The core is provided in the light input/output part to (Continued)

have a (111) plane or an equivalent plane to the (111) plane exposed on a face of a riser of the stepwise thickness of the light input/output part.

5 Claims, 16 Drawing Sheets

(51) Int. Cl.
    *G02B 6/136* (2006.01)
    *G02B 6/30* (2006.01)
    *G02B 6/34* (2006.01)
    *G02B 6/124* (2006.01)
    *G02B 6/126* (2006.01)

(52) U.S. Cl.
    CPC ............ *G02B 6/126* (2013.01); *G02B 6/136* (2013.01); *G02B 6/305* (2013.01); *G02B 6/34* (2013.01); *G02B 2006/12061* (2013.01); *G02B 2006/12147* (2013.01)

(58) Field of Classification Search
    CPC ............ G02B 6/34; G02B 2006/12061; G02B 2006/12147
    See application file for complete search history.

(56) References Cited

U.S. PATENT DOCUMENTS

| | | | | | |
|---|---|---|---|---|---|
| 4,597,003 | A * | 6/1986 | Aine | ................ | H01L 21/30608 257/418 |
| 4,783,237 | A * | 11/1988 | Aine | ................... | G01P 15/0802 216/2 |
| 4,938,841 | A * | 7/1990 | Shahar | ................ | G02B 6/1228 252/79.2 |
| 5,147,825 | A * | 9/1992 | Koch | ..................... | G02B 6/124 148/DIG. 106 |
| 5,262,346 | A * | 11/1993 | Bindal | ................ | H01L 21/3212 148/DIG. 168 |
| 5,288,659 | A * | 2/1994 | Koch | ..................... | G02B 6/124 148/DIG. 106 |
| 5,720,893 | A * | 2/1998 | Ben-Michael | ....... | G02B 6/1228 216/2 |
| 6,574,259 | B1 * | 6/2003 | Fish | ..................... | H01S 5/06256 372/50.1 |
| 6,865,204 | B2 * | 3/2005 | Matsuyama | ............ | H01S 5/227 372/46.01 |
| 6,937,797 | B2 * | 8/2005 | Mizuno | .............. | G02B 6/12011 385/14 |
| 7,099,540 | B2 * | 8/2006 | Shimoda | .............. | G02B 6/1228 385/49 |
| 7,305,167 | B2 * | 12/2007 | Hutchinson | ............ | G02B 6/131 385/131 |
| 8,126,301 | B2 * | 2/2012 | Ishizaka | ............... | G02B 6/1228 216/51 |
| 8,718,432 | B1 * | 5/2014 | Heideman | ............ | G02B 6/1228 216/13 |
| 8,913,860 | B2 * | 12/2014 | Ushida | ................ | G02B 6/1228 385/131 |
| 9,020,317 | B2 * | 4/2015 | Heideman | .............. | G02B 6/305 385/131 |
| 2002/0105989 | A1 * | 8/2002 | Matsuyama | ............ | H01S 5/227 372/46.01 |
| 2002/0154863 | A1 * | 10/2002 | Mizuno | .............. | G02B 6/12011 385/43 |
| 2003/0002793 | A1 * | 1/2003 | Dautartas | ............. | G02B 6/1228 385/37 |
| 2003/0111439 | A1 * | 6/2003 | Fetter | ...................... | H01L 41/29 216/13 |
| 2003/0138216 | A1 * | 7/2003 | Shimoda | .............. | G02B 6/1228 385/50 |
| 2004/0037497 | A1 * | 2/2004 | Lee | ........................ | G02B 6/132 385/28 |
| 2004/0114869 | A1 * | 6/2004 | Fike | ....................... | G02B 6/124 385/43 |
| 2005/0098855 | A1 * | 5/2005 | Shimoji | .............. | B81C 1/00626 257/621 |
| 2005/0265403 | A1 * | 12/2005 | Anderson | ............... | H01S 5/143 372/20 |
| 2007/0237482 | A1 * | 10/2007 | Hutchinson | ............ | G02B 6/131 385/131 |
| 2010/0086155 | A1 * | 4/2010 | Norgaard | ............... | H04R 25/558 381/315 |
| 2013/0170793 | A1 * | 7/2013 | Ushida | ................ | G02B 6/1228 385/43 |
| 2014/0105556 | A1 * | 4/2014 | Heideman | .............. | G02B 6/305 385/131 |

FOREIGN PATENT DOCUMENTS

| | | | | |
|---|---|---|---|---|
| JP | 58002806 A | * | 1/1983 | ........... G02B 6/2821 |
| JP | 05114767 A | * | 5/1993 | |
| JP | H05/114767 A | | 5/1993 | |
| JP | 09015435 A | * | 1/1997 | ........... G02B 6/1228 |
| JP | H09/15435 A | | 1/1997 | |
| JP | 2000-235128 A | | 8/2000 | |
| JP | 2000235128 A | * | 8/2000 | |
| JP | 2002-162528 A | | 6/2002 | |
| JP | 2002162528 A | * | 6/2002 | ......... G02B 6/12011 |
| JP | 2003-207684 A | | 7/2003 | |
| JP | 2003207684 A | * | 7/2003 | ........... G02B 6/1228 |
| JP | 2004-258610 A | | 9/2004 | |
| JP | 2004258610 A | * | 9/2004 | |
| JP | 2005-326876 A | | 11/2005 | |
| JP | 2009192783 A | * | 8/2009 | |
| JP | 2010-230982 A | | 10/2010 | |
| JP | 2010230982 A | * | 10/2010 | |
| JP | 2011-123094 A | | 6/2011 | |
| JP | 2011123094 A | * | 6/2011 | |
| WO | WO-02097489 A2 | | 12/2002 | |
| WO | WO 02097489 A2 | * | 12/2002 | ........... G02B 6/1228 |
| WO | WO 02097489 A3 | * | 11/2003 | ........... G02B 6/1228 |
| WO | WO-02097489 A3 | | 11/2003 | |
| WO | WO-2008/111447 A1 | | 9/2008 | |

* cited by examiner

OPTICAL DEVICE HAVING A STEPWISE OR TAPERED LIGHT INPUT/OUTPUT PART AND MANUFACTURING METHOD THEREFOR

CROSS REFERENCE TO RELATED APPLICATION

This application is a divisional of application Ser. No. 14/482,616, filed on Sep. 10, 2014, and allowed on Jan. 12, 2016. Furthermore, this application claims the benefit of priority of Japanese applications 2013-196083, filed on Sep. 20, 2013, and 2014-124662, filed on Jun. 17, 2014. The disclosures of these prior U.S. and Japanese applications are incorporated herein by reference.

BACKGROUND OF THE INVENTION

Field of the Invention

The present invention relates to a method of manufacturing an optical device, and, an optical device manufactured by the method.

Description of the Background Art

The optical subscriber line system implementing optical transmissions from subscribers to a central office (upstream transmission) and from the central office to subscribers (downstream transmission) over a single optical fiber line may use light beams having wavelengths different from each other between the upstream and downstream transmissions. The current mainstream of the subscriber line system is the GE-PON (Gigabit Ethernet (trademark)-Passive Optical Network), which bidirectionally implements fast communication of 1 Gbps or above. In recent years, investigations have been made on the WDM (Wavelength Division Multiplex)-PON with a higher level of multiplicity in communication wavelength, as a next-generation technology replacing the GE-PON. The WDM-PON can theoretically achieve a communication rate exceeding 10 Gbps in opposite directions.

In a WDM-PON, an optical fiber line for use in communication has its opposite ends provided with a central office-side line terminator, i.e. optical line terminal (OLT), and a subscriber-side line terminator, i.e. optical network unit (ONU), respectively, at the central office and the subscriber set. Those terminators have an optical chip having optical devices integrated thereon, such as light-emitting device, photo-sensitive device and wavelength multiplexer/demultiplexer.

In recent years, a Si optical waveguide comprised of a silicon (Si) core and a silicon oxide ($SiO_2$) cladding has been used for coupling optical devices on the optical chip. The Si optical waveguide, of which the core has its refractive index very much higher than the refractive index of the cladding, shows a strong effect of light confinement. Accordingly, by using the Si optical waveguide, it now becomes possible to form a curved optical waveguide which can bend light with a short radius of curvature of 1 μm or around. Another advantage is that the Si optical waveguide may be manufactured by process technologies for Si electronic devices, capable of achieving an extremely fine cross sectional structure of sub-micron level. Accordingly, by using the Si optical waveguide, the optical chip may be shrunk down to a level equivalent to the Si electronic devices. The Si optical waveguide, therefore, attracts attention as a solution of combining optics with electronics on a single on-chip.

Now, the cross sectional dimension of the Si optical waveguide equals to a fraction of that of external light-emitting device, photo-sensitive device or optical fiber, so that a spot-size converter is necessary in order to optically couple the wavelength to those devices.

Various types of spot-size converters have been proposed. For example, there is known a solution of gradating impurity concentration of the core depending on the distance from the input/output end, so as to decrease stepwise the refractive index of the core of the optical waveguide towards the input/output end, see Japanese patent laid-open publication No. 2004-258610 and U.S. Pat. No. 7,099,540 to Shimoda, for example. The solution is, however, only applicable to quartz-based optical waveguides having refractive index tunable to a desired extent through addition of impurity, and is hardly applicable to the Si optical waveguide which is not tunable in refractive index of the core to a desired extent by addition of impurity.

There is also known a solution of thinning either the width or thickness of the core of an optical waveguide in a tapered manner towards the input/output end, see U.S. Pat. No. 6,937,797 to Mizuno, et al., Japanese patent laid-open publication Nos. 2000-235128 and 2011-123094 for the width thinning, and see Japanese patent laid-open publication Nos. 15435/1997 and 2005-326876 for the thickness thinning, for example. With those solutions, however, a large difference appears between the width and thickness of the core of the input/output end, so that polarization dependence would occur in optical coupling with any of external optical devices.

There is therefore provided a solution of tapering both the width and thickness of the core of an optical waveguide towards the input/output end, aiming at suppressing the polarization dependence, see Japanese patent laid-open publication No. 2010-230982 and U.S. Pat. No. 8,126,301 to Ishizaka, for example. Both patent documents employ highly technical processes including photolithography in order to obtain a tapered form of the optical waveguide, reduced both in width and thickness.

In Japanese patent laid-open publication No. 2010-230982, use is made of an etching product which is generated in the process of dry etching of photoresist. The product has a tendency of being deposited on the surface to be etched composed of Si or the like so as to decelerate the etching. In the Japanese patent publication, making use of that tendency, the optical waveguide is tapered in the thickness-wise direction. More specifically, around the constant-thickness of Si tapered structure which is formed so as to be narrowed towards the input/output end, formed is a resist pattern by which the amount of deposition of the product may be reduced more extensively towards the end of taper. When the structure is dry-etched, the etch depth increases towards the end of taper where the amount of deposition of product becomes more scarce. As a consequence, a spot-size converter having its width and thickness tapered towards the input/output end at the end portion may be obtained.

In U.S. patent to Ishizuka, using an SOI (Si on Insulator) wafer, a spot-size converter having a Si optical waveguide is fabricated which is tapered in the width and the thickness. In more detail, over an SOI layer composed of single-crystalline Si, a $SiO_2$ film is formed. Over the surface of the $SiO_2$ film, a SiN film having a tapered shape in planar view is formed as a mask for suppressing oxidation of the SOI layer. The structure is then subjected to the LOCOS (LOCal Oxidation of Silicon) process. In a portion having a wide mask composed of the SiN film formed thereon, the SOI layer remains unoxidized, and thereby a Si optical waveguide with a large width and a large thickness is formed. Meanwhile in a portion with a narrow SiN film, a Si optical waveguide having a small width and a small thickness is formed corresponding to the mask width. In short, a spot-size converter tapered in the width and thickness is formed right under the SiN film.

Although not relevant to solutions regarding Si optical waveguides, as a solution of enhancing a coupling efficiency of light beam while suppressing variation in dimensional accuracy of the spot-size, there has been proposed a solution of forming the optical waveguide composed of a compound semiconductor by selective epitaxial growth, see Japanese patent laid-open publication No. 114767/1993, for example. According to this solution, over a single-crystalline InP substrate which serves as a cladding, a core composed of InGaAsP, InAlAs or the like is formed by selective epitaxial growth. In that process, by using a selective growth mask composed of SiN or the like for causing an opening to be gradated in the width of opening in a tapered manner, the resultant core will have its transverse cross section shaped into an isosceles triangle with its two equal sides configured by the (111) planes.

The solutions disclosed in Japanese patent laid-open publication No. 2010-230982 and U.S. patent to Ishizuka need, however, complicated manufacturing steps, suffering from dimensional variation in the spot-size converter even under slight changes in manufacturing conditions, and from destabilized coupling efficiency as a consequence.

It has also been understood that the solution disclosed in JP patent laid-open publication No. 114767/1993, based on selective epitaxial growth, is hardly applicable to a Si optical waveguide which uses an amorphous base typically composed of $SiO_2$.

Having exemplified the spot-size converter, the same problems in the dimensional accuracy have been known in other types of devices using a Si optical waveguide, such as grating coupler for use in deflecting the direction of light propagation, and polarization converter for use in shifting polarization planes.

SUMMARY OF THE INVENTION

The present invention was conceived considering the above-described problems. It is therefore an object of the present invention to provide a method of manufacturing an optical device which contains a Si optical waveguide, advantageously simplified in fabricating process and suppressed in the dimensional variation. It is also an object of the invention to provide an optical device obtainable by the manufacturing method.

The inventors found out that, in wet etching of single-crystalline Si in an alkaline solution, the (111) plane is hardly etched and instead serves as a so-called etch-stop plane.

Accordingly, the method of manufacturing an optical device of the present invention may be for use in manufacturing an optical device which has a waveguide including a core, a cladding provided around the core, and a light input/output part through which a light beam is input or output.

Specifically, a substrate is first prepared which has its principal surface covered with a substantially uniform thickness of single-crystalline film having its constituent atoms substantially forming a diamond lattice structure and its exposed surface being of neither the (111) plane nor its equivalent planes.

Next, the single-crystalline film is subjected to etching providing anisotropy depending on the plane orientation to form the film into terraced or tapered pattern in order to expose the (111) plane and its equivalent planes.

In accordance with the present invention, the optical device has an optical waveguide configured by a core and a cladding provided around the core. The optical waveguide is formed over the principal surface of a substrate. The cladding is herein configured by a substance having its refractive index smaller than 71.4% of the refractive index of the core, and the core has its constituent atoms substantially forming a diamond lattice structure. The optical waveguide has a light input/output part through which a light beam is input or output. The light input/output part is provided with a core which gets thinner stepwise towards the output end and tapers down in its width, the core having the (111) plane or equivalent plane thereto exposed on the face of a riser of the stepwise thickness of the light input/output part.

According to an alternative embodiment of the invention, the optical waveguide may have a light input/output part through which a light beam is input or output, and the light input/output part has a core which has two or more planes, including the (111) plane and its equivalent planes, two of the (111) and equivalent planes being substantially not parallel to one another.

According to the method of manufacturing an optical device of the invention, the process of fabricating an optical device containing a Si optical waveguide can advantageously be simplified, and the dimensional variation of optical devices can be suppressed. The yield of manufacturing the optical devices will be improved accordingly.

The inventive concept disclosed in the application may also be defined in ways other than in the claims presented below. The inventive concept may consist of several separate inventions particularly if the invention is considered in light of explicit or implicit subtasks or from the point of view of advantages achieved. In such a case, some of the attributes included in the claims may be superfluous from the point of view of separate inventive concepts. Within the framework of the basic inventive concept, features of different embodiments are applicable in connection with other embodiments.

It is to be understood that both the foregoing general description and the following detailed description are exemplary and explanatory and are not restrictive of the invention, as claimed.

BRIEF DESCRIPTION OF THE DRAWINGS

The objects and features of the present invention will become more apparent from consideration of the following detailed description taken in conjunction with the accompanying drawings in which.

DESCRIPTION OF THE PREFERRED EMBODIMENTS

Figure 1A:
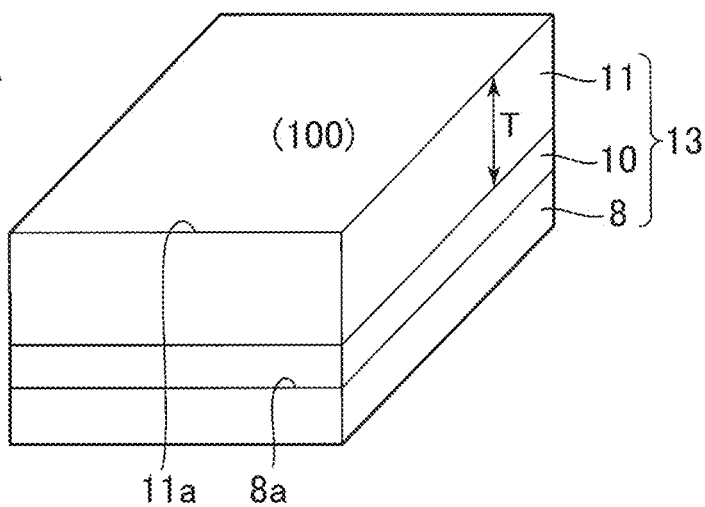
FIGS. 1A to 1F are schematic, perspective views for use in understanding the steps of manufacturing a spot-size converter in accordance with a first illustrative embodiment.

Preferred embodiments of the present invention will be described referring to the accompanying drawings. Note that, in the drawings, the geometry, dimension and positional relationship of constituents are merely illustrative to an extent sufficient to help the reader understand the invention. Materials and numerical conditions of such constituents of preferred embodiments described below are merely preferable examples. The present invention is, therefore, by no means limited to the embodiments described below. In the figures of the accompanying drawings, like constituents will be given the same reference numerals or symbols so as to avoid repetitive description thereon. The reference numerals or symbols may not be depicted in some cases where relationships with those in other figures are explicit.

Nomenclature of Crystal Planes

Prior to describing the embodiments of the invention, nomenclature of crystal planes will be briefed. The crystal planes are expressed, according to a general method, using the Miller index enclosed in parentheses "( )", such as (1-11), where "-1" means "1" with a bar. The plane orientation put in curly brackets "{ }", such as {111}, denotes a family of the equivalent planes to the (111) plane. In other words, {111} planes generally represent eight planes including (111), (11-1), (1-11), (-111), (-11-1), (-1-11), (1-1-1) and (-1-1-1). The normal line to a crystal plane is expressed using angle brackets "[ ]". For example, the normal line to the (110) plane is expressed by [110].

Outline of Manufacturing Method

Next, the method of manufacturing an optical device will be outlined. It has been known that, in the process of wet etching using an alkaline solution, single-crystalline Si, as a material for composing a Si optical waveguide, is etched at an etch rate, which may be different depending upon the plane orientation. In more detail, in the process of etching using an aqueous KOH solution added with isopropanol (also referred to as "IPA"), a magnitude relation of etch rate depending on plane orientation follows the expression (1). In other words, the wet etching using an alkaline solution shows anisotropy depending on the plane orientation.

$$v\{100\} > v\{110\} \gg v\{111\}, \quad (1)$$

where, v{100}, v{110} and v{111} represent etch rates on the {100} planes, {110} planes and {111} planes, respectively. In the context, the "wet etching using an alkaline solution" may also be simply referred to as the "wet etching".

The reason why the etch rates so differ is supposedly ascribable, mainly, to the crystal structure of Si per se. Si having a diamond lattice crystal structure shows the number of bonds between a surface-exposed Si atom and atoms inside the crystal being different depending on the crystal planes.

In more detail, a Si atom exposed on the {100} plane combines with Si atoms inside the crystal through two bonds. By contrast, a Si atom exposed on the {111} planes combines with Si atoms inside the crystal through three bonds, so that the surface-exposed Si atom is more stabilized than on the {100} planes. Such a difference in the number of bonds possibly formed between a surface-exposed Si atom and Si atoms inside the crystal is understood as the difference in the etch rate given by the expression (1).

For example, when an aqueous solution containing by weight 23.4% of KOH, 13.3% of IPA, and 63.3% of water at 80° C. is used as the alkaline solution, the etch rates on the (100) plane and the (111) plane are approximately 0.6 μm/min and approximately 0.006 μm/min, respectively. As known from the above, since the etch rate on the {111} planes is 1/100 or below of the etch rate on the {100} planes, so that, upon exposure of the {111} planes, the etching will substantially stop thereon. In other words, the {111} planes function as an etch-stop plane.

Accordingly, by using the {111} planes for some major structure which may take part in function of the optical device, the optical device directed to exhibiting desired functions is now obtainable by wet etching, with an excellent dimensional accuracy and reproducibility.

Method of Manufacturing Spot-Size Converter of First Embodiment

Next, with reference to FIGS. 1A to 1F, a method of manufacturing a spot-size converter 100 in accordance with a first illustrative embodiment will be described as an exemplary optical device of the present invention. FIGS. 1A to 1F schematically show, in perspective views, some of the sequential process steps of manufacturing the spot-size converter 100 of the first embodiment. Note that, although the core which composes the spot-size converter 100 would not be visible in FIG. 1F since it is actually hidden in the cladding, it is depicted by a solid line in order to easily grasp the entire structure of the device.

First, as illustrated in FIG. 1A, prepared is a substrate 8 having its principal surface 8a covered with a single-crystalline film 11 of a substantially uniform thickness T, which has its constituent atoms substantially forming a diamond lattice structure and its exposed surface being of neither the (111) plane nor its equivalent planes. In this example, an SOI layer of an SOI substrate 13 is utilized as the single-crystalline film 11. Also in this example, used is the SOI substrate 13 in which the (100) plane is exposed to the surface 11a of single-crystalline Si. A BOX (Buried-OXide) layer interposed between the substrate 8 and the single-crystalline film 11 functions as a lower cladding 10.

Figure 1B:
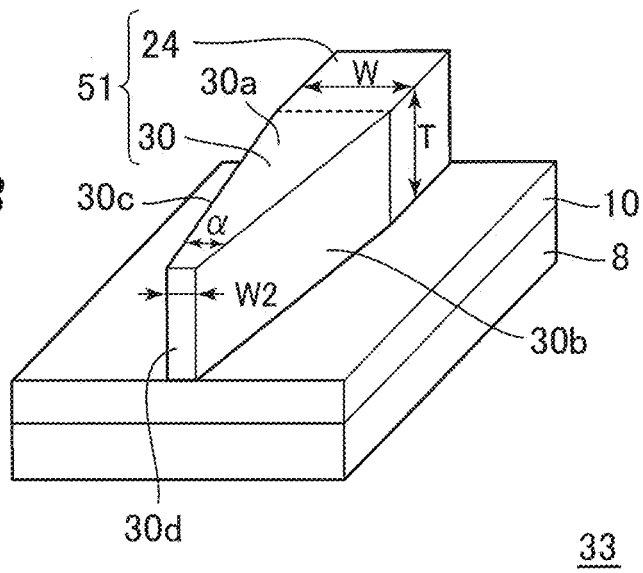

Next, in the first step illustrated in FIG. 1B, the single-crystalline film 11 is patterned to thereby form a precursor structure 51 having a precursor 30 of a light input/output part 22 into the uniform thickness T.

More specifically, for example by photolithography used in manufacturing processes of Si electronic devices, an unnecessary portion of the single-crystalline film 11 is removed. In this way, over the lower cladding 10, a core body 24 and the precursor 30 of the light input/output part 22 are formed into an integration.

The precursor 30 has an isosceles trapezoidal top face 30a, and given in the form of right rectangular cylinder with the thickness of T. The isosceles trapezoid in a plan view is characterized by the width which linearly changes, i.e. decreases in this example, from width W, corresponding to the lower base on the core body 24 side, towards width W2, corresponding to the upper base on the side of an end face 30d of the end portion, where W is larger than W2.

Figure 1C:
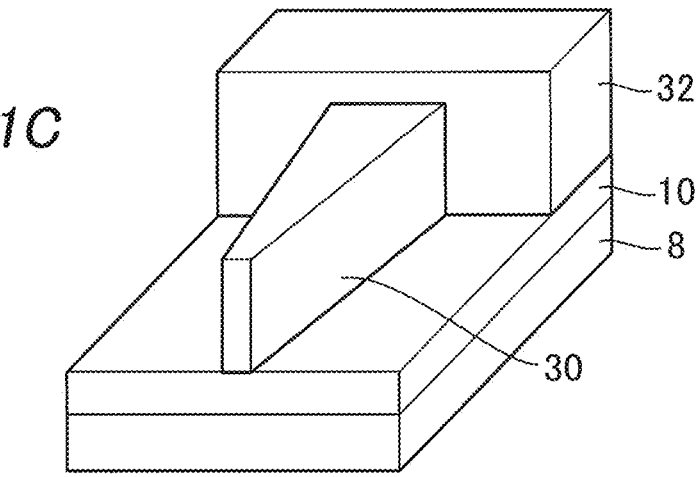

Next in the second step illustrated in FIG. 1C, formed is a structure 33 in which an etching mask 32 is formed so as to expose the precursor 30 of the light input/output part 22 of the precursor structure 51 and to cover the rest of the structure.

More specifically, the core body 24 is covered with the etching mask 32 typically composed of a photoresist. The etching mask 32 protects the core body 24 from wet etching. The etching mask 32 is patterned according to a general method for use in manufacturing processes of Si electronic devices.

Figure 1D:
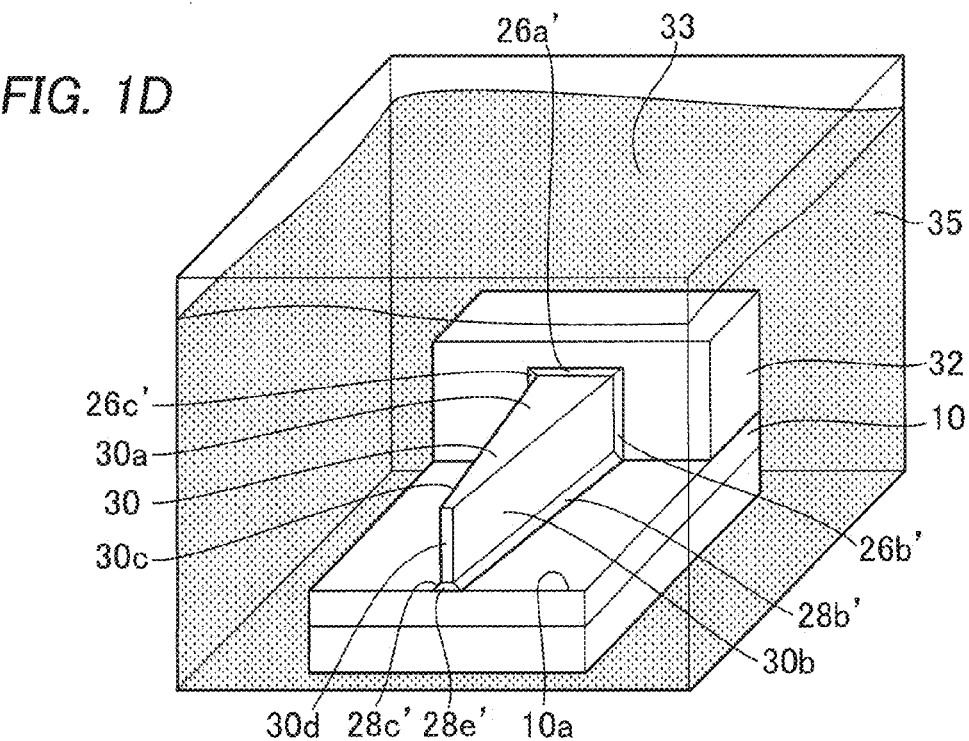

Next, in the third step illustrated in FIG. 1D, the structure 33 having the etching mask 32 formed thereon is immersed into an alkaline solution 35. In this way, the precursor 30 of the light input/output part 22 is wet-etched while functionalizing the (111) plane and the equivalent planes thereto as etch-stop planes.

As described previously, the wet etching proceeds preferentially on the planes which are etchable rapidly to the planes which are etchable relatively slowly, thus the latter being exposed. Finally, the etching stops on the exposed surface of the {111} planes.

The alkaline solution 35 used in this example is an aqueous KOH solution added with IPA. In this process, as indicated by the expression (1) above, the {100} planes are etched first to expose the {110} planes and the {111} planes which are etchable relatively slowly. Thus, in the precursor 30, four planes 30a, 30b, 30c and 30d, corresponding to the {100} planes are first to be etched.

As a consequence, at a connective part between the core body 24 and the precursor 30, there appear exposed surfaces 26a', 26b' and 26c' composed of the {110} planes, which gradually expand as the etching of the {100} planes proceeds. Those exposed surfaces 26a', 26b' and 26c' will be connective planes 26a, 26b and 26c at the end of wet etching as shown in FIG. 1E.

Similarly, at a connective part between the top face 10a of the lower cladding 10 and the precursor 30, there appear exposed surfaces 28b', 28c' and 28e' composed of the {111} planes as an etch-stop plane, which gradually expand as the etching proceeds. Those exposed surfaces 28b', 28c' and 28e' will be slopes 28b, 28c and 28e at the end of the wet etching as shown in FIG. 1E.

Figure 1E:
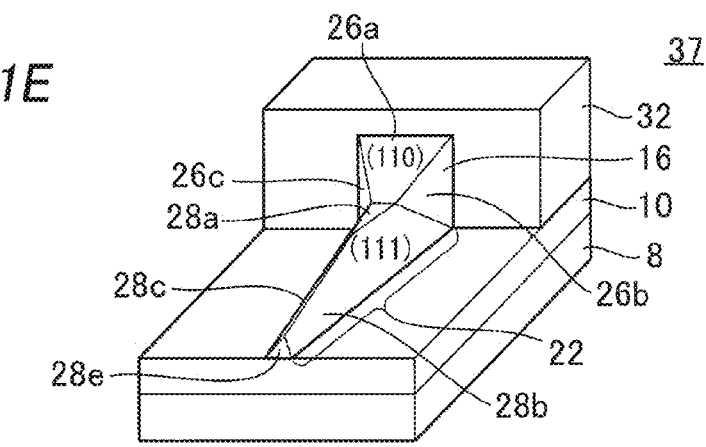

FIG. 1E illustrates the structure 37 at the end of the wet etching. With reference to the figure, the core 16 of the structure 37, has all slopes of the light input/output part 22 formed therein other its tip end.

More specifically, in the structure 37, two slopes 28b and 28c, which are the (111) planes, expose symmetrically about the center line of the light input/output part 22 having an isosceles trapezoidal shape in a plan view. The slopes 28b and 28c are substantially non-parallel to each other but cross with each other at the center line, assumed as a ridge, of the light input/output part 22. The (111) plane also exposes at the end of the light input/output part 22 as the slope 28e.

Also in the connective part between the core body 24 and the precursor 30, three connective planes 26a, 26b and 26c composed of three {110} planes are exposed.

In this example, an aqueous KOH solution added with IPA was used as the alkaline solution for wet etching. The alkaline solution is, however, not limited thereto but is selectable from aqueous NaOH solution, aqueous CsOH solution, aqueous tetramethylammonium hydrate $((CH_3)_4NOH)$ solution, aqueous ethylenediamine $(C_2H_8N_2)$ solution, aqueous ethylenediamine pyrocatechol solution, aqueous hydrazine hydrate $(N_2H_4.H_2O)$ solution, and aqueous ammonium hydroxide $(NH_4OH)$ solution, all of which are usable independently or in a mixed manner depending on purposes. Also any additives such as IPA may be added.

Figure 1F:
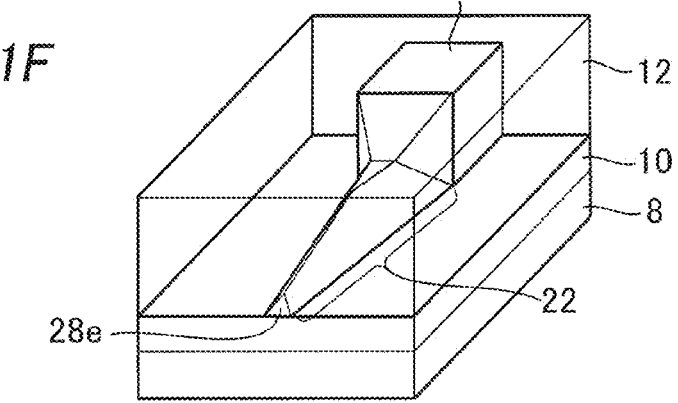

Next, in the fourth step illustrated in FIG. 1F, the etching mask 32 is removed by ashing according to general procedures. Next, in the fifth step, $SiO_2$ is formed as the upper cladding 12 so as to cover the structure from which the etching mask 32 has already been removed. The upper cladding 12 in this case is formed by CVD (Chemical Vapor Deposition) according to general procedures. $SiO_2$ composing the upper cladding 12 may alternatively be deposited by vacuum evaporation, sputtering or flame hydrolysis deposition, rather than being limited to CVD.

Figure 2:
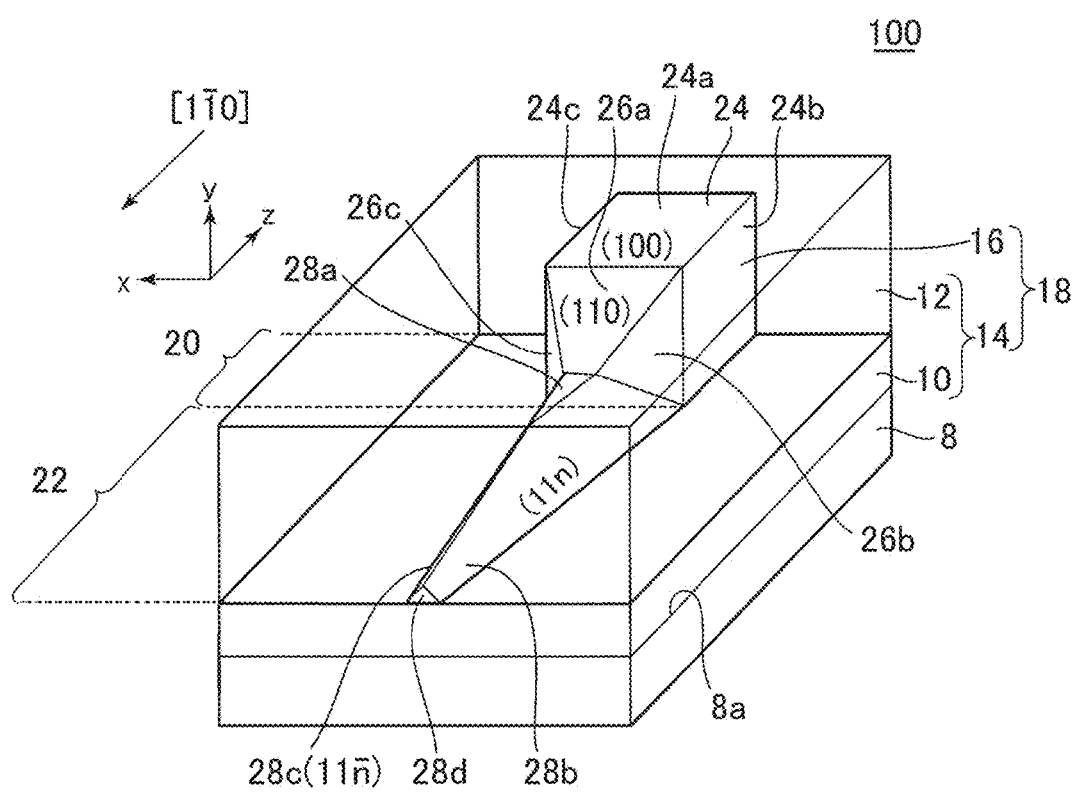
FIG. 2 schematically illustrates, in a perspective view, the configuration of the spot-size converter of the first embodiment.
Figure 4:
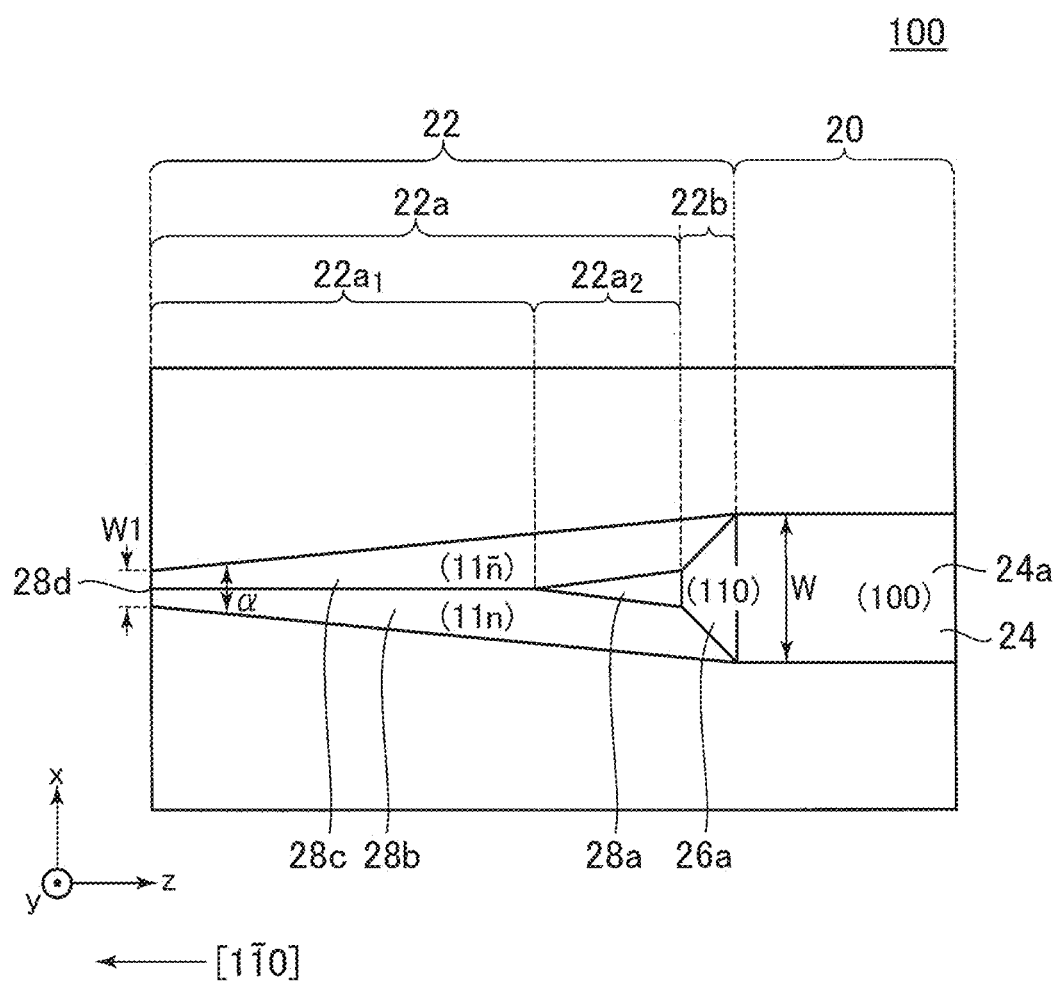
FIG. 4 is a plan view of the converter shown in FIG. 2.

Lastly, as illustrated in FIG. 2, the slope 28e configured by the (111) plane exposed at the end of the light input/output part 22 is truncated in the direction substantially perpendicular to the direction of light propagation, indicated by an arrow [1-10], to thereby form the end portion 28d having a width of W1, FIG. 4. The spot-size converter 100 of the first embodiment is obtained in this way. Dicing or RIE (Reactive Ion Etching) may be used for the truncation.

The reason why the slope 28e, configured by the (111) plane, is substantially perpendicularly truncated is to facilitate alignment of the spot-size converter 100 of the first illustrative embodiment with an external optical device, which will be optically coupled therewith. In more detail, if the end of the light input/output part 22 remained as the (111) plane in the form of slope 28e, FIG. 1F, then a light beam having propagated through the light input/output part 22 would be output from the slope 28e in the [111] direction, upwardly inclined at 35.3° with respect to the principal surface 8a. In order to maximize herein the coupling efficiency of light, an optical fiber for example to be optically coupled therewith need be obliquely arranged at a precise angle. In contrast, if the slope 28e is substantially perpendicularly truncated, a light beam will be output from the end portion 28d of the light input/output part 22 substantially in parallel to the principal surface 8a. Thus, the coupling efficiency of light may be maximized simply by arranging the optical fiber or the like substantially in parallel to the principal surface 8a.

Configuration and Operation of Spot-Size Converter of First Embodiment

Figure 3A:
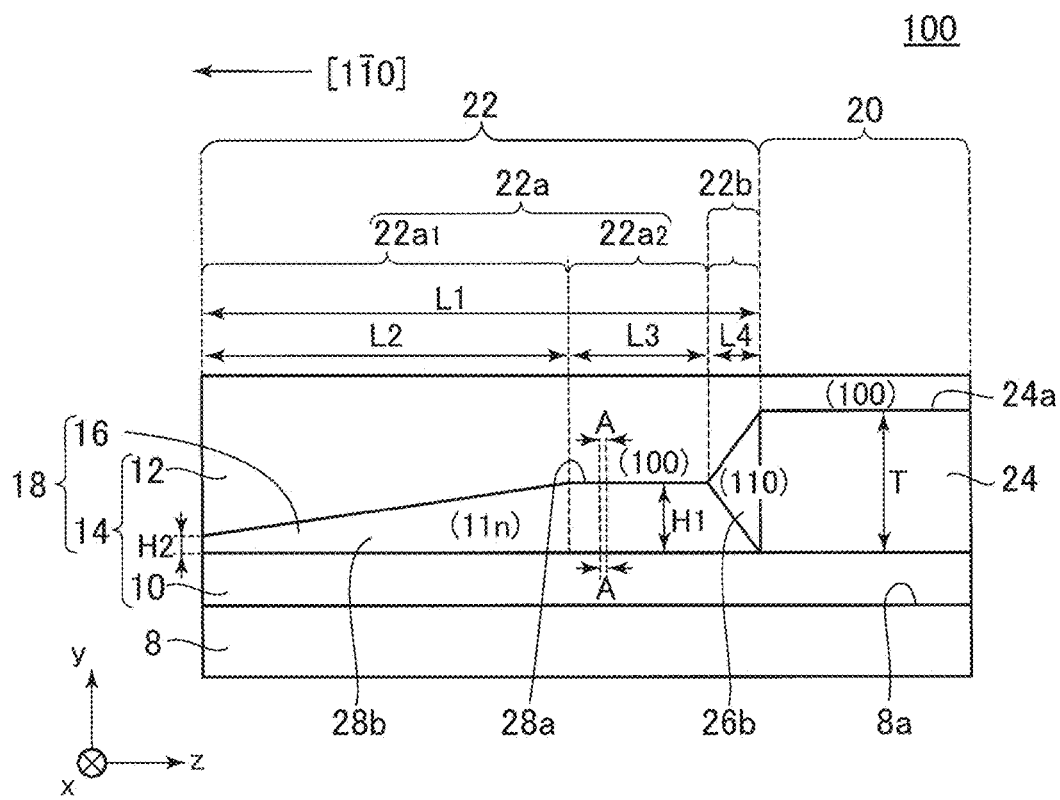
FIG. 3A is a schematic side elevation of the spot-size converter shown in FIG. 2.
Figure 3B:
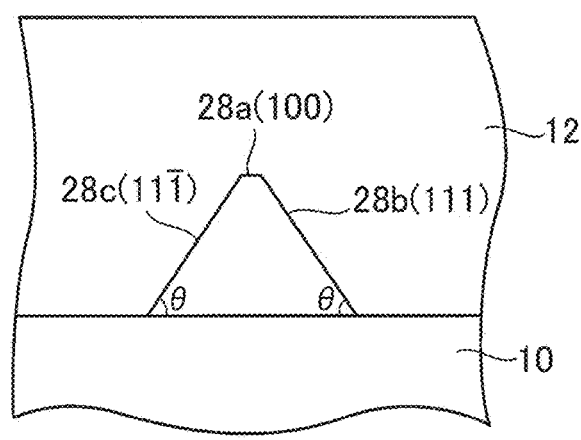
FIG. 3B is an end elevation of a slice "A" shown in FIG. 3A.
Figure 5:
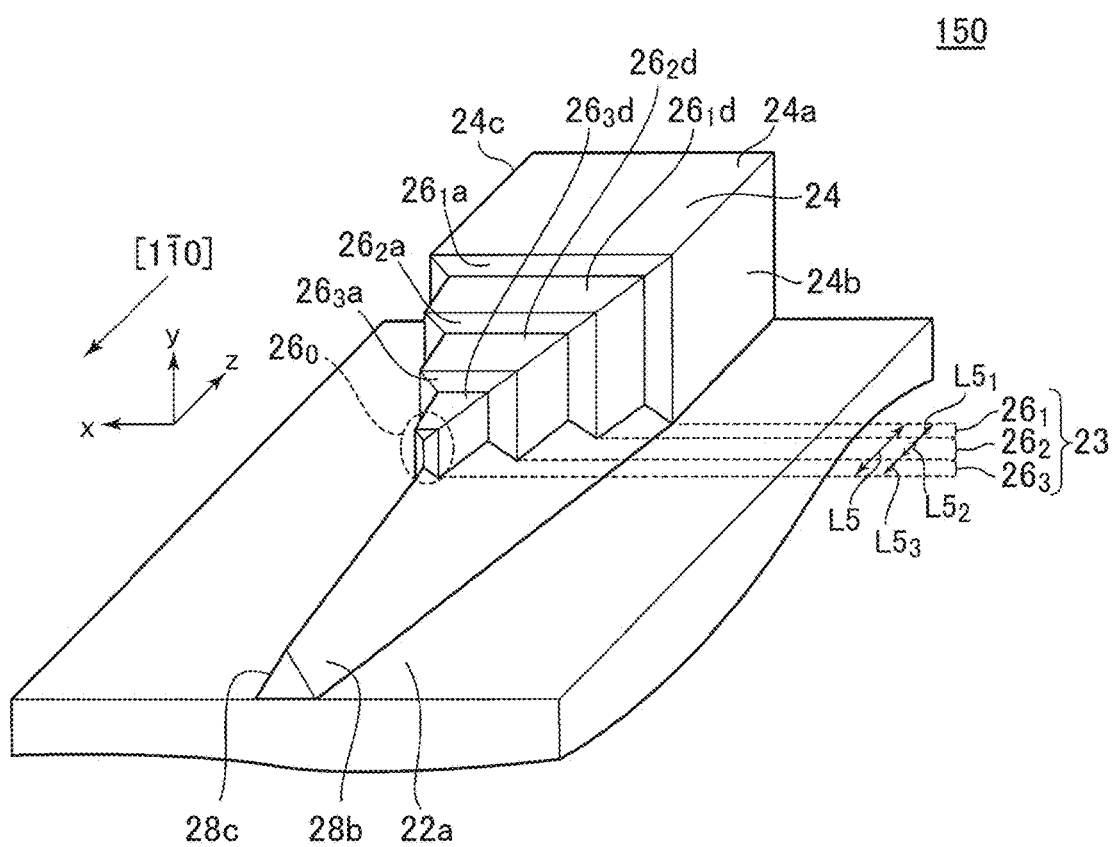
FIG. 5 is a schematic, perspective view illustrating a first modified embodiment of the spot-size converter of the first embodiment.
Figure 6A:
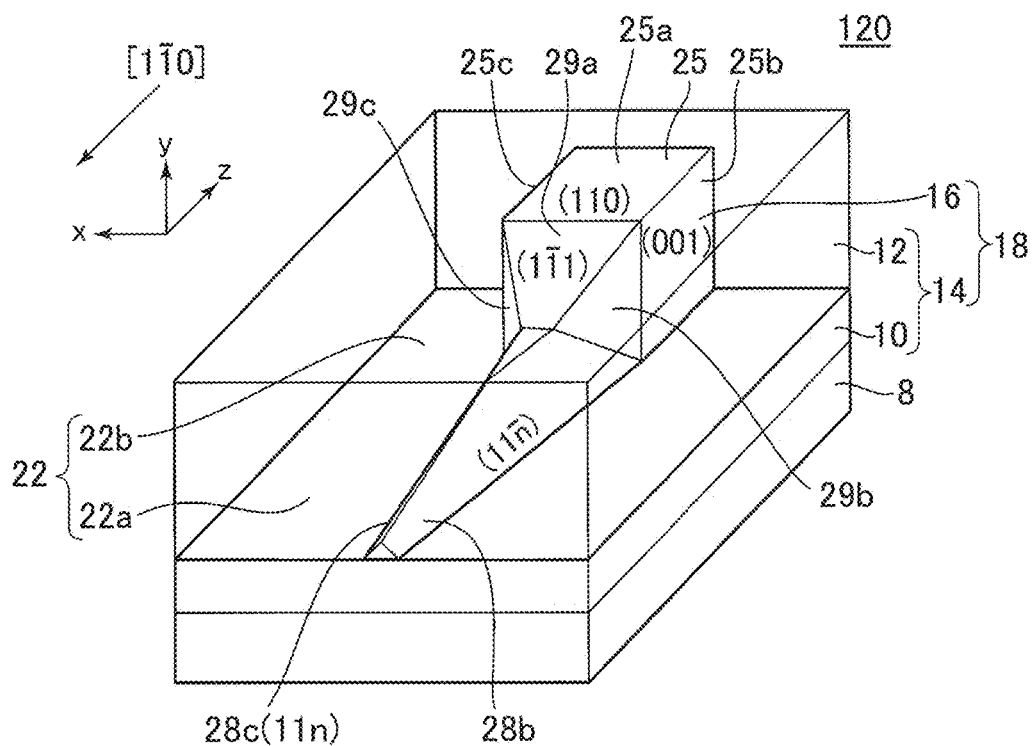
FIGS. 6A and 6B are schematic, perspective views respectively illustrating second and third modified embodiments of the spot-size converter of the first embodiment.
Figure 6B:
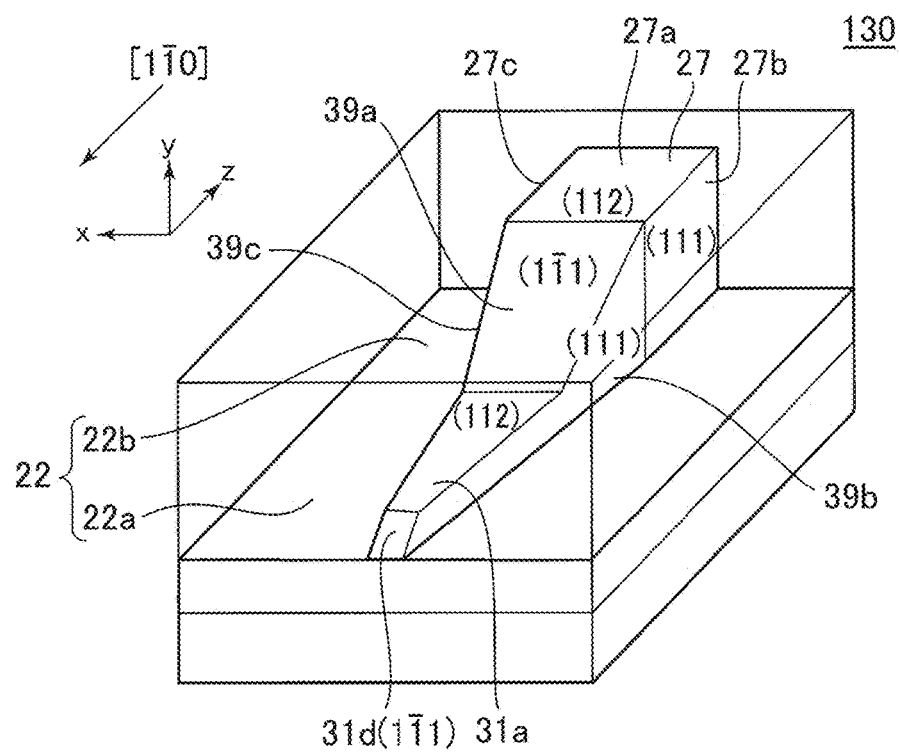

Next, referring to FIGS. 2 to 6B, the spot-size converter will be described in accordance with the first illustrative embodiment. FIG. 2 schematically illustrates, in a perspective view, the configuration of the spot-size converter 100 of the first embodiment. FIG. 3A is a side elevation of the spot-size converter shown in FIG. 2, and FIG. 3B is an end elevation of a slice "A" shown in FIG. 3A. FIG. 4 is a plan view of the converter shown in FIG. 2. FIGS. 5, 6A and 6B are perspective views schematically illustrating modified embodiments of the spot-size converter of the first embodiment.

Note that, although the core which composes the spot-size converter would not be visible in FIGS. 2 to 6B since it is actually hidden in the cladding, it is depicted by solid lines in order to easily understand the entire structure of the device. In FIG. 5, parts of the cladding and the substrate are not illustrated.

Definition of Coordinate System

First with reference to FIG. 2, a coordinate system used in the description below will be defined. Consider now a right-handed coordinate system as illustrated in FIG. 2, where the x-direction is defined by the leftward direction on the sheet of the figure, also referred to as the width-wise direction. The z-direction is defined by the direction parallel to the direction of light propagation, also referred to as the length-wise direction. The y-direction is defined by the upward direction penetrating the sheet of the figure, also referred to as the height-wise or thickness-wise direction. Geometrical length measured in the x-direction is also referred to as "width", geometrical length measured in the y-direction is also referred to as "height" or "thickness", and geometrical length measured in the z-direction is also referred to as "length". In this example, the [1-10] direction which is parallel to the direction of normal line to the (1-10) plane is also referred to as the direction of light propagation. The direction of light propagation is opposite to the z-direction. The cross section of a certain structure, perpendicular to the direction of light propagation, is referred to as a "transverse cross section".

Configuration

Referring to FIGS. 2 to 4, the configuration of the spot-size converter 100 of the first embodiment will be described. The spot-size converter 100 of the first embodiment has an optical waveguide 18 provided over the principal surface 8a of the substrate 8. The optical waveguide 18 has the core 16 and a cladding 14. The core 16 is in this example composed of single-crystalline Si forming a diamond lattice structure. The core 16 herein conceptually denotes the entire structure composed of single-crystalline Si. That is, the core 16 includes a core body 24 in a light propagating part 20, and a single-crystalline Si structure in a light input/output part 22.

The cladding 14 includes a lower cladding 10 and an upper cladding 12. In this example, both of the upper and lower claddings 12 and 10 are composed of $SiO_2$. As described above, the optical waveguide 18 is configured as a Si optical waveguide, having the core 16 made of Si and the cladding 14 made of $SiO_2$. The core 16 and the cladding 14 will be detailed later.

The spot-size converter 100 of the first illustrative embodiment has the light propagating part 20 having the core body 24, and the light input/output part 22 connected to the light propagating part 20.

The light propagating part 20 is a channel-type optical waveguide configured by the core body 24 and the surrounding cladding 14. The core body 24 configuring the light propagating part 20 has a substantially square transverse cross section. In more detail, the core body 24 in this example has its height T and width W each equal to approximately 0.3 μm. The core body 24 has its top face 24a which lies herein in parallel with the principal surface 8a and is configured by the (100) plane as illustrated in FIG. 2.

The transverse cross section of the core body 24 thus formed into a square now renders the light propagating part 20 polarization-independent. Also the light propagating part 20 now having its height T and width W arranged in the range from 0.2 to 0.5 μm allows a beam of light of approximately 1.55 μm in wavelength, predominantly employed in the next-generation PON, to be transmitted therethrough in a single mode both in the height-wise and width-wise directions.

Referring now to FIGS. 3A and 4, the light input/output part 22 is an optical waveguide configured by the core 16 having its structure suitable for spot size conversion built therein, and the cladding 14 surrounding the core.

The light input/output part 22 has a optical input/output functional part 22a and a connective part 22b.

The functional part 22a is adapted for converting the spot size of light which propagates through the light propagating part 20. More specifically, a light beam which is transmitted through the light propagating part 20 in the direction of light propagation is enlarged in the spot size by the light input/output part 22, and coupled to an external device, not shown, such as an optical fiber. As another example, a light beam emitted from an external device such as LD (Laser Diode) is shrunk in the spot size by the light input/output part 22, and then coupled to the light propagating part 20. In the context, the "spot size" means distance between a point where the amplitude of electric field of light beam becomes maximum to a point where the amplitude attenuates to 1/e, where e is the Napier's constant.

Now, the schematic geometry of the functional part 22a will be described. Referring now to FIG. 4, the planar shape of the functional part 22a is given by an isosceles trapezoid which becomes narrowed from the core body 24 towards the end portion 28d. The functional part 22a has first and second regions $22a_1$ and $22a_2$ having the transverse cross sections thereof different from each other. The first and second regions $22a_1$ and $22a_2$ share the slopes 28b and 28c.

The first region $22a_1$ has a length of L2, and has its transverse cross section given in the form of isosceles triangle. In the first region $22a_1$, the transverse cross sectional area linearly shrinks towards the end portion in the direction of light propagation, while keeping the similarity of isosceles triangle. The second region $22a_2$ has a length of L3, and has its transverse cross section given in the form of isosceles trapezoid with a constant height of H1. The second region $22a_2$ has its flat top face 28a whose planar shape forms an isosceles triangular, which linearly shrinks in width in the direction of light propagation, where the (100) plane exposes similarly to the top face 24a of the core body 24. In the second region $22a_2$, the width of isosceles trapezoid with a constant height of H1 linearly shrinks in the direction of light propagation. At the boundary between the second and first regions $22a_2$ and $22a_1$, the width of the top face 28a becomes 0 (zero), where the shape of transverse cross section changes from isosceles trapezoid to isosceles triangle.

The shape of the transverse cross section of the first region $22a_1$ may alternatively be an isosceles trapezoid having its two legs configured by the {111} planes.

In a macroscopic view, the slopes 28b and 28c of the functional part 22a are configured by a (11n) plane and a (11-n) plane, where n represents a natural number, respectively. Meanwhile, as illustrated in FIG. 3B, in a microscopic view while assuming a thin slice having a thickness of "A", FIG. 3A, in the level of unit lattice of crystal, the slopes 28b and 28c are configured by the (111) plane and the (11-1) plane, respectively. As described above, the light input/output part 22 has the core 16 which has two or more planes in total, i.e. (111) plane (slope 28b) and its equivalent (11-1)

plane (slope 28c), which are arranged substantially in non-parallel to each other. In the following paragraphs, it is understood that the phrase stating that the optical device has the "(111) plane" encompasses not only the macroscopic case but also the microscopic case as described above.

As described above, the slopes 28b and 28c configured by the {111} planes serve as the etch-stop planes which will finally expose in the wet etching. Angles θ formed by the slopes 28b and 28c, i.e. the (111) and (11-1) planes, respectively, with respect to the principal surface 8a of the substrate 8 are 54.7°.

The light input/output part 22 is has its end portion 28d configured by a plane substantially perpendicular to the direction of light propagation. The end portion 28d has its cross sectional area large enough so as not to cut off the fundamental mode of light which propagates through the functional part 22a. In more detail, the sectional area of the end portion 28d is determined so that the fundamental mode of TE and TM waves of the propagating light can propagate to reach the end portion 28d without causing the radiation mode. By configuring the end portion 28d in this way, it now becomes possible to suppress radiation loss of the propagating light, and to enhance the coupling efficiency of light to an external device. In the paragraphs below, TE and TM waves may collectively be termed as "both polarized waves".

The connective part 22b is arranged for connecting the core body 24 to the functional part 22a, and may be formed by wet etching. As a consequence, the connective planes 26a, 26b and 26c, which are three {110} planes etchable at substantially the same rate, expose in the connective part 22b. The connective planes 26a, 26b and 26c intersect with the top face 24a and both side faces 24b and 24c of the core body 24, which are the {100} planes, at an angle of 45°. The connective planes 26a, 26b and 26c are connected with the top face 28a and the slopes 28b and 28c of the functional part 22a, respectively. The connective part 22b has a length of L4.

Now the core 16 and the cladding 14 will be described. The core 16 made of Si is formed by using the SOI layer 11 of the SOI substrate 13, FIG. 1A. The core has a refractive index of approximately 3.48. Note that the core 16 may alternatively be made of Ge which again has a diamond lattice crystal structure.

The upper and lower claddings 12 and 10 composing the cladding 14 are provided at the upside and downside while placing the lower face of the core 16 in between, and both claddings 12 and 10 surround the core 16. $SiO_2$ which configures the upper and lower claddings 12 and 10 has a refractive index of approximately 1.44. In more detail, the lower cladding 10 is a BOX layer of the SOI substrate 13. The upper cladding 12 is formed after all necessary structures were fabricated into the core 16 as described above.

In order to suppress undesired coupling of light, which propagates through the core 16, to the substrate 8, it is preferable to provide a lower cladding 10 having a thickness of 1 μm or larger, between the core 16 and the substrate 8. In this example, the lower cladding 10 is approximately 1.5 μm thick. By adjusting the refractive index of the cladding 14 not larger than 71.4% of the refractive index of the core 16, the core 16 will have an enhanced performance of light confinement, allowing formation of a curved optical waveguide with a small radius of curvature.

Material composing the cladding 14 may be the same as, or different from, those composing the upper and lower claddings 12 and 10. Materials for composing the upper and lower claddings 12 and 10, other than $SiO_2$, is selectable from the group consisting of SiOx, where x represents a real number between null and two, i.e. 0<x<2, SiON, and optical resins. The optical resins herein mean those generally for use in optical instruments, and may be exemplified by polymethyl methacrylate resin, polyester resin, acrylate resin, phenolic resin and so forth.

Next, typical dimensions of the spot-size converter 100 of the first illustrative embodiment will be exemplified. The overall length L1 of the light input/output part 22 typically falls in the range from 200 to 300 μm. The width W1 of the end portion 28d typically falls in the range from 0.2 to 0.25 μm. By adjusting L1 and W1 in those ranges, the propagation loss of light through the input/output part 22, and the loss of manufacturing cost due to increase in size of device may be reduced in a sufficiently well-balanced manner from a practical point of view.

While the dimensions other than L1 and W1 may automatically be determined by wet etching, typical dimensions will be enumerated below for better understanding of the geometry of the spot-size converter 100 of the first illustrative embodiment. The length L3 of the second region $22a_2$ of the functional part 22a typically falls in the range from 0 to 50 μm. The height H1 of the second region $22a_2$ typically falls in the range from 0.15 to 0.18 μm. The taper angle α of the functional part 22a typically falls in the range from 0.010° to 0.029°. The height H2 of the end portion 28d typically falls in the range from 0.14 to 0.18 μm.

Operation

Next, with appropriate reference to FIGS. 2 to 4, the operation of the spot-size converter 100 will be described in accordance with the first illustrative embodiment. Exemplified herein is a case where a light beam which propagates through the light propagating part 20 in the direction of light propagation is coupled to an external optical fiber. Let the wavelength of propagating light be approximately 1.55 μm, the dimensions of the individual parts of the spot-size converter 100 be given as above, the refractive index of Si be 3.48, and the refractive index of $SiO_2$ be 1.44.

The light beam which propagates through the light propagating part 20 is coupled to the light input/output part 22. That is, the light beam propagates via the connective part 22b and through the functional part 22a. Now, in the functional part 22a, the cross sectional area of the core 16 shrinks in the direction of light propagation. This means that the equivalent refractive index relevant to the propagating light gradually decreases as the light approaches the end portion 28d of the functional part 22a. Since the smaller the equivalent refractive index, the smaller the ability of light confinement into the core 16, so that the propagating light will more widely spread outward from the core 16 as the light comes further in the direction of propagation through the functional part 22a. In other words, the spot size of the propagating light beam becomes larger as the light beam propagates further through the functional part 22a towards the end portion 28d.

Note herein that, as described previously, the end portion 28d has its cross sectional area enough to allow the light to propagate therethrough in the fundamental mode, so that the propagating light beam is output from the end portion 28d in the direction of light propagation with its spot size enlarged. Accordingly, by appropriately disposing an external device, having its light input/output part substantially equivalent in size with the spot size of the output light beam, so as to oppose with the end portion 28d, the output light is coupled with the external device in an efficient manner.

Given, for example, that the wavelength of light is approximately 1.55 μm, the spot size of light output from the portion 28d expands up to approximately 0.3 µm or around. Accordingly, the spot-size converter 100 will successfully couple the light beam to an external device such as lensed optical fiber, round-tip optical fiber or the like.

It will now be described why the spot-size converter 100 of the first embodiment can operate in a polarization-independent manner. For the polarization-independent operation of the spot-size converter 100, it is necessary to match, in the functional part 22a, the equivalent refractive indices of both polarized waves in the fundamental mode in a sufficiently accurate manner.

Now, as for an exemplary spot-size converter, also referred to as "conventional converter", which is tapered both in the width and height to attain polarization independence as disclosed in Japanese patent laid-open publication No. 2010-230982 and U.S. patent to Ishizuka, described earlier, the equivalent refractive index and spot size of both polarized waves were summarized in Table 1 below. The values in the Table below were determined assuming that the core has its size allowing both polarized waves in the fundamental mode to get cut off. In more detail, the cladding is made of $SiO_2$, and the core made of Si, 0.15 µm wide and 0.15 µm high.

TABLE 1

Conventional Converter
Transverse cross section of core is square,
width = 0.15 µm, height = 0.15 µm.

|  | Equivalent refractive index | Spot size | | |
| --- | --- | --- | --- | --- |
|  |  | Width-wise (µm) | Length-wise (µm) | Area (µm²) |
| Fundamental TE mode | 1.45 | 0.44 | 0.368 | 0.509 |
| Fundamental TM mode | 1.45 | 0.368 | 0.44 | 0.509 |

As understood from above, as for the conventional converter in which the core has its transverse cross section gradually reducing while keeping the square form, the equivalent refractive indices of both polarized waves almost coincide. It is also understood from the equality of the spot area that the conventional spot-size converter can operate in a polarization-independent manner.

Similarly, as for the spot-size converter 100 of the first illustrative embodiment, the equivalent refractive index and spot size of both polarized waves were summarized in Table 2 below. In the spot-size converter 100, in the process of light propagation through the functional part 22a in the direction of light propagation, the fundamental TM-polarized light becomes cut off earlier than the fundamental TE-polarized light. For this reason, the values in the Table below were determined assuming that the core has its size allowing the TM-polarized light beams in the fundamental mode to get cut off. In more detail, the transverse cross section of the core 16 of the functional part 22a was assumed to be an isosceles triangle having a width of 0.28 µm and a height of 0.20 µm.

TABLE 2

First Embodiment
Transverse cross section of core is isosceles
triangle, width = 0.28 µm, height = 0.20 µm.

|  | Equivalent refractive index | Spot size | | |
| --- | --- | --- | --- | --- |
|  |  | Width-wise (µm) | Length-wise (µm) | Area (µm²) |
| Fundamental TE mode | 1.47 | 0.307 | 0.126 | 0.121 |
| Fundamental TM mode | 1.45 | 0.13 | 0.29 | 0.118 |

As understood from above, as for the spot-size converter 100 of the first illustrative embodiment, difference in the equivalent refractive indices between the TE-polarized light and the TM-polarized light amounts only approximately 1.3%, showing an agreement in a range considered to be enough for the practical use. In short, the spot-size converter 100 of the embodiment can operate in a polarization-independent manner. It is also understood from the proximity of the spot area that the spot-size converter 100 can operate in a polarization-independent manner successfully enough for the practical use.

ADVANTAGES

Next, the advantages of the first illustrative embodiment, and hence of the present invention will be described. According to the manufacturing method of the embodiment, involving the wet etching using the alkaline solution, the optical device may be manufactured with a good dimensional accuracy and reproducibility. For an exemplary case of the spot-size converter 100 of the embodiment, the height of the functional part 22a having its transverse cross sectional shape of isosceles triangle is automatically given by the width of the core 16 by the wet etching. In short, unlike the prior art, the dimensional accuracy of the spot-size converter is now independent of the dimensional accuracy of photolithography or dry etching. The yield of manufacturing of the spot-size converter may thus be improved.

Referring back to Table 1, in the conventional converter, the core width which allows the fundamental propagating light to be cut off is 0.15 µm. By contrast, referring again to Table 2, in the spot-size converter 100 of the first embodiment, the core width which allows the fundamental propagating light to be cut off is 0.28 µm, larger than in the conventional converter.

More specifically, when compared at the same taper angle (α, FIG. 5) of the tapered optical waveguide which takes part in spot size conversion, the functional part 22a of the spot-size converter 100 of the first embodiment can convert the spot size with a shorter length than the tapered optical waveguide of the conventional converter can. Accordingly, the spot-size converter 100 may be made smaller than the conventional converter, while keeping the functions at an equivalent level.

By contrast, when compared under the condition that the length of the functional part 22a is set substantially equal to the length of the tapered optical waveguide of the conventional converter, the spot-size converter 100 of the first embodiment can more successfully reduce the radiation loss of light than the conventional converter can.

Modified Embodiments

Next, modified embodiments of the spot-size converter 100 in accordance with the first illustrative embodiment will be described referring to FIGS. 5, 6A and 6B.

FIG. 5 is a schematic, perspective view illustrating a spot-size converter 150 of a first modified embodiment. The spot-size converter 150 of the modified embodiment may be configured similarly to the spot-size converter 100 of the first illustrative embodiment, except for the configuration of a connective part 23. Description will be made mainly on the difference.

In the spot-size converter 150 of the first modified embodiment, the connective part 23 is configured "as terraced". More specifically, in the connective part 23, three sub-connective parts $26_1$ to $26_3$ are arrayed in series in the direction of light propagation. The sub-connective part $26_1$ has a sub-connective planes $26_1a$ configured by the slope of the (110) plane and a sub-plane $26_1d$ connected to the sub-connective planes $26_1a$. The sub-plane $26_1d$ is configured by the (100) plane, showing the same surface orientation with the top face 24a of the core body 24. Also the sub-connective parts $26_2$ and $26_3$ similarly have sub-connective planes $26_2a$ and $26_3a$, and sub-planes $26_2d$ and $26_3d$, respectively.

All of the sub-connective planes $26_1a$, $26_2a$ and $26_3a$ may equally be configured by the (110) planes, and have the transverse cross section thereof shrunk stepwise in area in the direction of light propagation. Between the adjoining sub-connective parts $26_1$ and $26_2$, the sub-plane $26_1d$ and the sub-connective plane $26_2a$ are connected. The same will apply also between the sub-connective parts $26_2$ and $26_3$.

In the instant modified embodiment, also regions corresponding to both side faces 24b and 24c of the core body 24, and regions corresponding to both slopes 28b and 28c of the functional part 22a are configured as terraced.

Next, a method of manufacturing the connective part 23 will be described. The thus terraced connective part 23 may be fabricated by repeating the second to fourth steps described earlier, while increasing stepwise the length of the core body 24 which exposes out from the etching mask 32, FIG. 1C.

In more detail, the etching mask 32 is first formed so as to locally expose such a portion of the core body 24 that corresponds to a length of $L5_3$ measured from the end and will be processed into the connective part 23, and the structure is then wet-etched. The etching mask 32 is then removed. In this way, the region to be processed into the third sub-connective part $26_3$ went through the first etching.

Next, a new etching mask 32 is formed so as to locally expose such a portion of the core body 24 that corresponds to a length of $(L5_3+L5_2)$ measured from the end and will be processed into the connective part 23, and the structure is then wet-etched. The etching mask 32 is then removed. In this way, the region to be processed into the third sub-connective part $26_3$ went through the second etching, and the region to be processed into the second sub-connective part $26_2$ went through the first wet etching.

Next, a further etching mask 32 is formed so as to locally expose such a portion the core body 24 that corresponds to a length of $(L5_3+L5_2+L5_1)$ measured from the end and will be processed into the connective part 23, and the structure is then wet-etched. The etching mask 32 is then removed.

As a consequence, after having gone through the wet etching three times, the third sub-connective part $26_3$ is finished with the smallest size. Similarly, after having gone through the wet etching twice, the second sub-connective part $26_2$ is finished with a size larger than that of the third sub-connective part $26_3$. Again similarly, after gone through the wet etching once, the first sub-connective part $26_1$ is finished with a size larger than that of the second sub-connective part $26_2$.

Note that, in the spot-size converter 150 of the first modified embodiment, the configuration of a connective region $26_0$ between the connective part 23 and the functional part 22a is different from a corresponding region, around the top face 28a in FIG. 2, of the spot-size converter 100 of the first illustrative embodiment. Such a difference in configuration is ascribable to differences in ratio of width to height of the core body 24, and wet etching conditions including etching time.

As described so far, in the spot-size converter 150 of the first modified embodiment, the connective part 23 is formed as terraced. This is equivalent to that the single-slope connective plane 26 of the spot-size converter 100 of the first illustrative is divided into three sub-connective planes $26_1a$ to $26_3a$, while respectively providing the sub-planes $26_1d$ and $26_2d$ in between. As a consequence, the length L5 of the connective part 23 is longer than the length L4 of the connective part 22a of the spot-size converter 100, FIG. 3A, of the first illustrative embodiment. The inclination of the connective part 23 therefore becomes moderate as compared with the inclination (45°) of the connective part 22a, and the diffraction loss of light may be reduced more successfully around the connective part 23 than around the connective part 22a.

Subsequently with reference to FIGS. 6A and 6B, spot-size converters 120 and 130 of the second and third modified embodiments will be described.

In the spot-size converter 100 of the first illustrative embodiment described earlier, the top face 24a of the core body 24, that is, the surface 11a of the single-crystalline film 11 was configured by the (100) plane. The surface 11a of the single-crystalline film 11 may, however, be an arbitrary (kjj) plane, where k and j represent integers of 0 or larger, and k is not equal to j, only if it is not configured by the {111} planes. Also by using such single-crystalline film 11, the spot-size converter may be manufactured by the wet etching which makes use of two or more non-parallel {111} planes as an etch stop plane.

FIG. 6A exemplifies a spot-size converter 120 of the second modified embodiment, in which the surface 11a of the single-crystalline film 11 is configured by the (110) plane. In this case, the geometry of the spot-size converter 120 of the second modified embodiment may be similar to the spot-size converter 100, FIG. 3, of the first embodiment but a major difference resides in the plane orientation of the connective planes 29a, 29b and 29c of the connective part 22b.

In more detail, whereas the connective planes 26a, 26b and 26c of the spot-size converter 100 of the first illustrative embodiment were configured by the {110} planes, the connective planes 29a, 29b and 29c of the spot-size converter 120 of the second modified embodiment are configured by the {111} planes. Also in the spot-size converter 120 of the second modified embodiment, the top face 25a of the core body 25 is configured by the (110) plane, and both side faces 25b and 25c are configured by the (001) planes.

The method of manufacturing the spot-size converter 120 of the second modified embodiment may be similar to that for the spot-size converter 100 of the first illustrative embodiment, except that, in the third step, the {111} planes expose as the connective planes 29a, 29b and 29c which function as the etch-stop plane.

The SOI substrate 13, in which the single-crystalline film 11 has the (110) plane exposed to the surface 11a thereof, is commercially available.

The spot-size converter 120 of the second modified embodiment exhibits the same advantages as the spot-size converter 100 of the first illustrative embodiment.

FIG. 6B exemplifies a spot-size converter 130 of the third modified embodiment, in which the surface 11a of the single-crystalline film 11 is configured by the (112) plane. In this case, the geometry of the spot-size converter 130 of the third modified embodiment changes from that of the spot-size converter 100, FIG. 2, of the first embodiment. More specifically, the spot-size converter 130 of the third modified embodiment is different from the spot-size converter 100 of the first embodiment in the geometry of the transverse cross section of the functional part 22a, which is now generally rectangular.

In more detail, in the spot-size converter 130 of the third modified embodiment, the core body 27 has its top face 27a configured by the (112) plane, and both side faces 27b and 27c configured by the (111) planes. The light input/output part 22 has a generally rectangular cross section substantially perpendicular to the direction of light propagation, and is linearly tapered in width towards the end portion 31d.

The connective part 22b is surrounded by a connective plane 39a, which is the (1-11) plane connected to the top face 27a of the core body 27, and side faces 39b and 39c which are the (111) planes connected to the connective plane 39a. The functional part 22a has a flat part 31a configured by the (112) plane, and an end portion 31d connected to the flat part 31a and configured by the (1-11) plane.

As described above, in the spot-size converter 130 of the third modified embodiment, the side faces 39b and 39c are configured by the (111) planes substantially non-parallel to each other.

The method of manufacturing the spot-size converter 130 of the third modified embodiment may be similar to that for the spot-size converter 100 of the first illustrative embodiment, except that, in the third step, the {111} planes expose as the connective planes 39a and both side faces 39b and 39c which function as the etch-stop plane, and the (112) plane exposes as the flat part 31a of the functional part 22a.

Spot-Size Converter of Second Embodiment

Figure 7A:
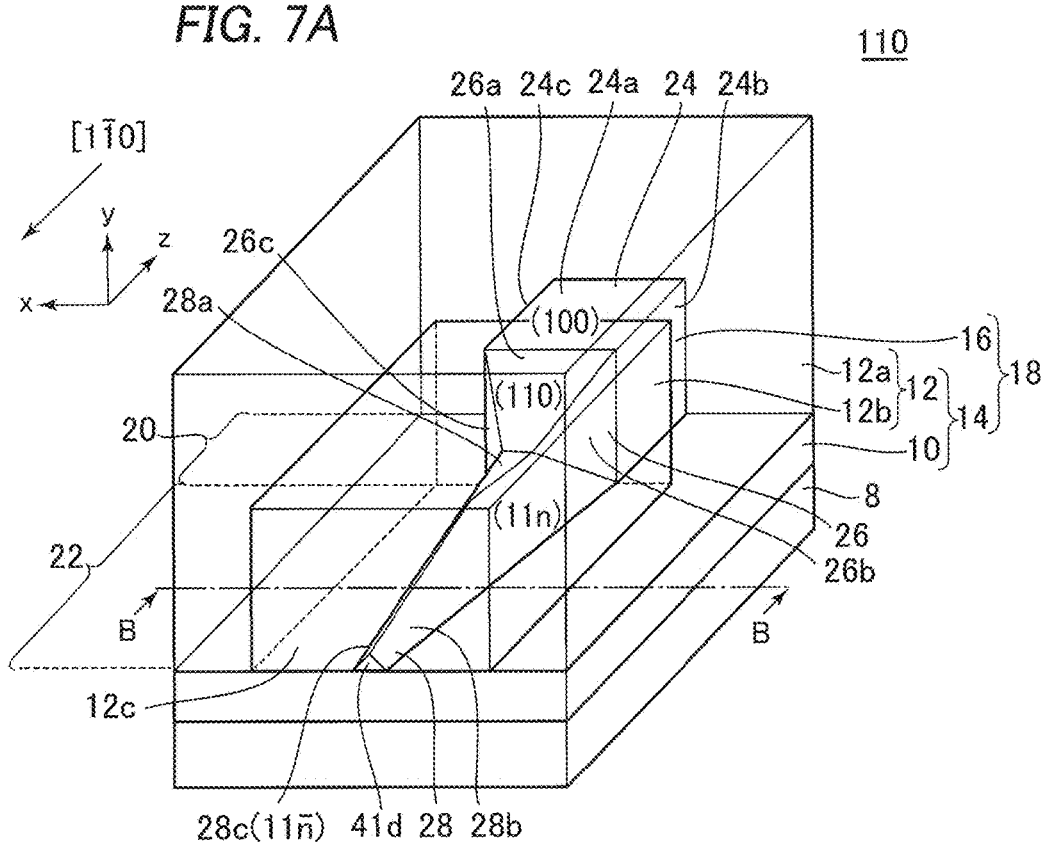
FIG. 7A schematically illustrates, in a perspective view, the configuration of a spot-size converter in accordance with a second illustrative embodiment.
Figure 7B:
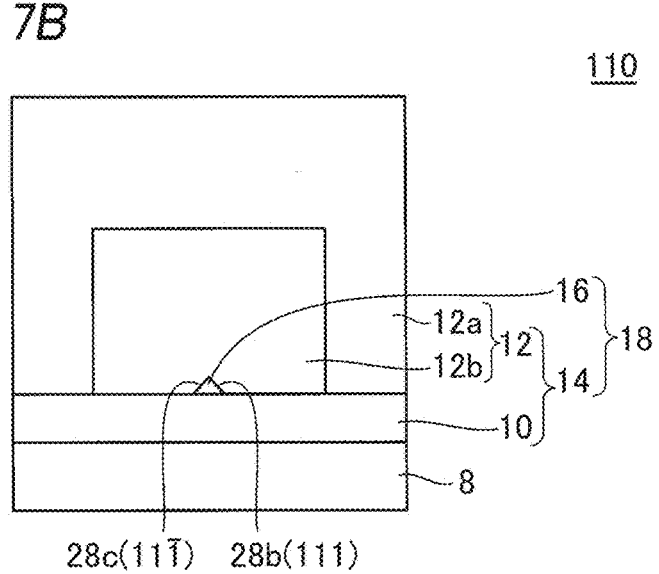
FIG. 7B is an end elevation taken along line B-B in FIG. 7A.
Figure 8A:
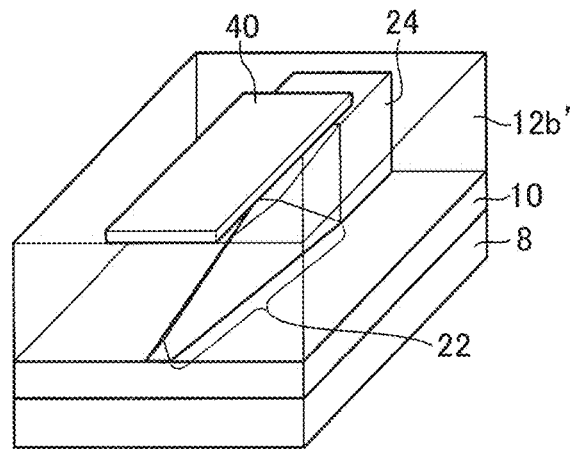
FIGS. 8A, 8B and 8C are schematic, perspective views for use in understanding the steps of manufacturing the spot-size converter of the second embodiment.
Figure 8B:
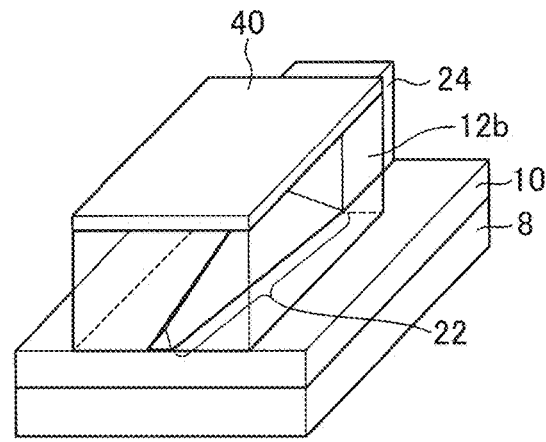
Figure 8C:
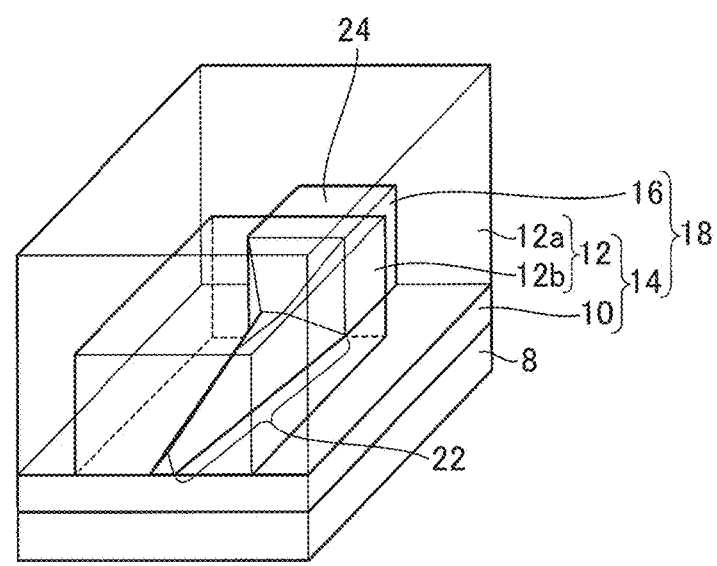

Next, an alternative embodiment of the spot-size converter will be described referring to FIGS. 7A to 8C. FIG. 7A schematically shows in a perspective view the configuration of a spot-size converter 110 of a second illustrative embodiment. FIG. 7B is an end elevation taken along line B-B in FIG. 7A. FIGS. 8A, 8B and 8C are schematic, perspective views useful for understanding the steps of manufacturing the spot-size converter 110 of the second embodiment. Note that, although the core 16 and the second cladding 12b would not be visible in FIGS. 7A, 8A, 8B and 8C since they are actually covered with the upper cladding 12a, they are depicted by solid lines in order to easily understand the entire structure of the device.

The spot-size converter 110 of the second embodiment may be configured similarly to the spot-size converter 100 of the first illustrative embodiment, except for that the second cladding 12b covers the light input/output part 22 and the upper cladding 12a covers the second cladding 12b, and that the cross sectional area of the end portion 41d is smaller. Description will be made mainly on the differences.

As seen from FIGS. 7A and 7B, the spot-size converter 110 of the second illustrative embodiment has a cubic second cladding 12b provided around the light input/output part 22. The second cladding 12b has its refractive index substantially larger than that of $SiO_2$ composing the upper and lower claddings 12a and 10, and smaller than that of the core 16. In this example, the second cladding 12b is configured by $Si_3N_4$ with a refractive index of approximately 1.989. The transverse cross sectional shape of the second cladding 12b, in this example, is a square of approximately 3 μm each side.

Unlike the spot-size converter 100 of the first illustrative embodiment, the end portion 41d of the light input/output part 22 has its cross sectional area set smaller than the area which allows both polarized waves in the fundamental mode to be cut off. Accordingly, almost the entire part of the light beam which propagates through the input/output part 22 is guided into the second cladding 12b.

Since the second cladding 12b has its refractive index of a value falling between that of the core 16 and those of the upper and lower claddings 12a and 10, so that it functions as if it were a core in relation to the upper and lower claddings 12a and 10. As a consequence, the light beam guided from the core 16 into the second cladding 12b proceeds through the second cladding 12b in the direction of light propagation. The light beam is then output from the end face 12c, having its spot size enlarged closely to the size of the transverse cross section of the second cladding 12b.

Next, the method of manufacturing the spot-size converter 110 of the second illustrative embodiment will be described referring to FIGS. 8A, 8B and 8C. The method of manufacturing the spot-size converter 110 of the second embodiment may be similar to the method of manufacturing the spot-size converter 100 of the first illustrative embodiment, except for the fifth step. The description below will therefore deal with the difference. The fifth step of manufacturing the spot-size converter 110 of the second embodiment includes a first and a second sub-step.

More specifically, as illustrated in FIG. 8A, in the first sub-step, the structure obtained after the fourth step, that is, removal of the etching mask 32 shown in FIG. 1E, is covered with a material 12b' having its refractive index larger than that of the lower cladding 10 and smaller than that of the core 16. Then, onto such a portion of the material 12b' that will be processed into the second cladding 12b, a mask 40 is locally formed, and the structure is etched. As a consequence, as illustrated in FIG. 8B, the second cladding 12b in the form of generally rectangular parallelepiped is formed so as to cover the light input/output part 22.

In the second sub-step, the mask 40 is removed by a general method as shown in FIG. 8C, and thereafter the second cladding 12b and the entire portion of the core 16 are covered with the upper cladding 12a. In this way, the spot-size converter 110 of the second illustrative embodiment is obtained as depicted in FIG. 7A.

The spot-size converter 110 of the second illustrative embodiment can convert the spot size of a propagating light beam to a substantially larger size than the spot-size converter 100 of the first illustrative embodiment, which is not equipped with the second cladding 12b. Accordingly, by placing an external device so as to oppose with the end face 12c of the second cladding 12b, light may more efficiently be coupled to the external device. Given that the light beam is approximately 1.55 μm in wavelength, the spot size of the light beam, when having propagated through the second cladding 12b, expands up to 3 μm or around in this example. Accordingly, the light beam output from the end face 12c is enlarged in diameter up to 6 μm or around, and can easily be coupled to a general single-mode optical fiber.

Method of Manufacturing Spot-Size Converter of Third Embodiment

Next, the method of manufacturing a spot-size converter 400 of the third illustrative embodiment, yet another alternative embodiment, of the invention will be described by referring to FIGS. 9A to 11. FIGS. 9A to 9I are perspective view useful for understanding the steps of manufacturing the spot-size converter 400 of the third illustrative embodiment. Note that, although the core which composes the spot-size converter would not be visible in FIG. 9G since it is actually hidden in the cladding, it is depicted by a solid line in order to easily understand the entire structure of the device.

Figure 9A:
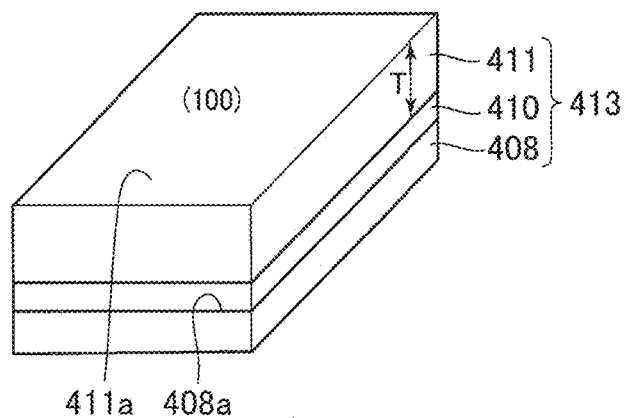
FIGS. 9A to 9I are perspective views useful for understanding the steps of manufacturing the spot-size converter in accordance with a third illustrative embodiment.

As shown in FIG. 9A, firstly prepared is a substrate 408 having its principal surface 408a provided thereon with a substantially uniform thickness T of single-crystalline film 411 which has its constituent atoms substantially forming a diamond lattice structure and has its exposed surface being neither the (111) plane nor its equivalent planes. In this example, as the single-crystalline film 411, an SOI layer of an SOI substrate 413 is used. In this example, the SOI substrate 413 is used in which the (100) plane is exposed to the surface 411a of single-crystalline Si. A BOX layer interposed between the substrate 408 and the single-crystalline film 411 functions as a lower cladding 410. The core is formed of Si in the illustrative embodiment, and may not be limited thereto but may be formed of semiconductor material, such as GaAs or InP, that can be subjected to anisotropic etching.

Then, the first step is carried out to form the single-crystalline film into a terraced pattern. The first step includes a first and a second sub-step, which are performed repeatedly.

Figure 9B:
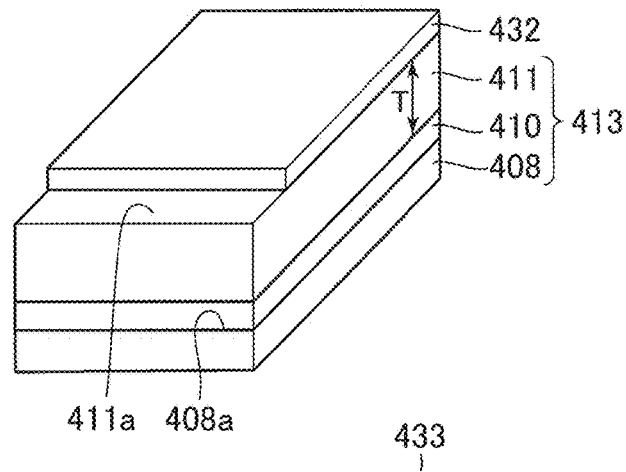

In the first sub-step illustrated in FIG. 9B, for instance, an etching mask 432 is formed on the single-crystalline film 411 by means of a photoresist. The etching mask 432 is formed such that the whole part of the single-crystalline film 411 on its one end in the longitudinal direction is exposed in the cross direction, and the rest of the top surface of the film 411 is covered with the etching mask 432. The etching mask 432 is patterned according to a general method used in manufacturing processes of Si electronic devices. The material of the etching mask may not be limited to the photoresist, and instead a material resistable to an anisotropic etchant, such as silicon nitride ($Si_3N_4$), may be used.

Figure 9C:
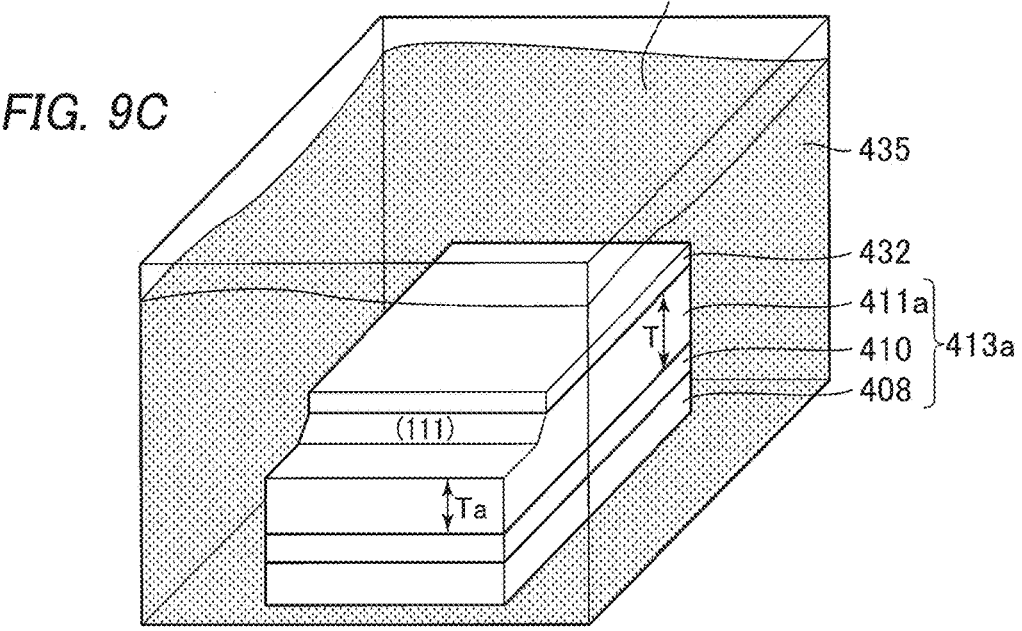

Next, in the second sub-step illustrated in FIG. 9C, a structure 413a having the etching mask 432 formed thereon is immersed into an alkaline solution 435. The alkaline solution 435 may be an aqueous potassium hydroxide (KOH) solution, by way of example. The etching using the aqueous KOH solution is the so-called anisotropic etching.

In this example, an aqueous KOH solution added with IPA was used as the alkaline solution for wet etching. The alkaline solution may, however, not be limited thereto, but is selectable from aqueous NaOH solution, aqueous CsOH solution, aqueous tetramethylammonium hydrate (($CH_3$)$_4$NOH) solution, aqueous ethylenediamine ($C_2H_8N_2$) solution, aqueous ethylenediamine pyrocatechol solution, aqueous hydrazine hydrate ($N_2H_4 \cdot H_2O$) solution, and aqueous ammonium hydroxide ($NH_4OH$) solution, all of which are usable independently or in a mixed manner depending on purposes. Also any additives such as IPA may be added.

A gas-phase etching method using HCl or $H_2$ can also be applied as long as the method has a property that etching speed varies significantly depending on a plane orientation.

In the second sub-step, a part of the single-crystalline film 411 not covered with the etching mask 432 is etched whereas the remaining part of the film 411, covered with the etching mask, is not etched. As a consequence, the single-crystalline film 411a is divided into a first section having its thickness Ta thinner than the thickness T and a second section where the thickness T is maintained. The first and second sections have a boundary between them, in which the (111) plane slowly etchable is exposed. After the wet etching, the etching mask 432 is removed.

Figure 9D:
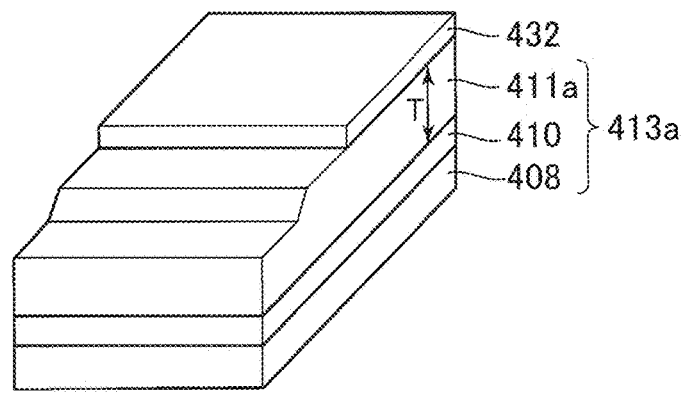

Subsequently, the single-crystalline film 411a is covered with the etching mask 432 in the first sub-step shown in FIG. 9D. The etching mask 432 is formed in such a way that the whole part of the second section on its side in the longitudinal direction, which is etched in the second sub-step, is exposed in a cross direction and the rest of the top surface of the second section of the single-crystalline film 411 is covered with the etching mask 432. The etching mask 432 is patterned according to a general method for use in manufacturing processes of Si electronic devices.

Figure 9E:
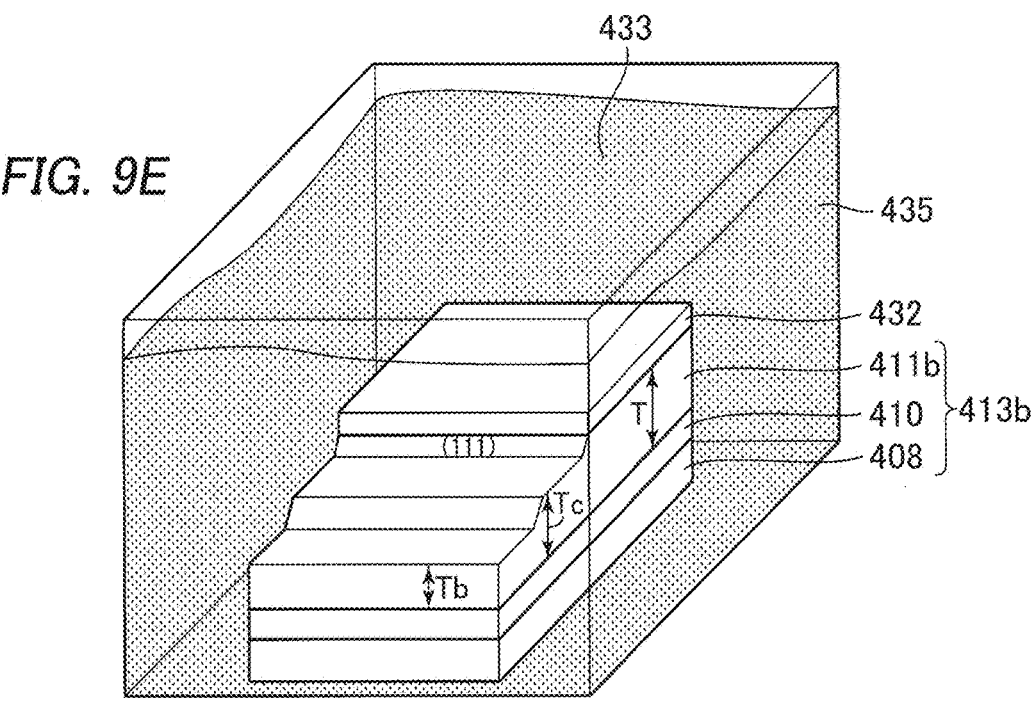
Figure 9F:
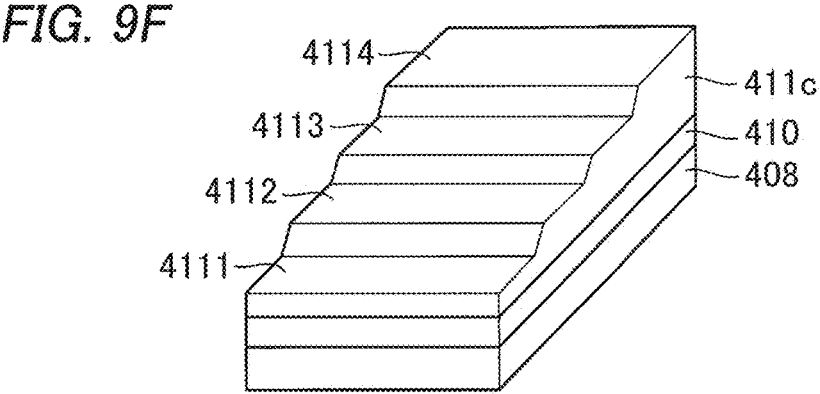

Then in the second sub-step illustrated in FIG. 9E, the structure 413a having the etching mask 432 formed thereon is immersed into an alkaline solution 435. As a result, part of the single-crystalline film 411 not covered with the etching mask 432 is etched whereas the remaining part of the film 411, covered with the etching mask, is not etched. Consequently, the non-etched portion of the second section becomes a third section.

The single-crystalline film 411b is divided into a first section having its thickness Tb thinner than the thickness Ta, a second section having its thickness Tc thicker than Tb and thinner than T, and a third section where the thickness T is maintained. The second and third sections have a boundary between them, in which the (111) plane slowly etchable is exposed. After the wet etching, the etching mask 432 is removed.

When the first and second sub-steps are carried out continuously, the single-crystalline film has been divided into a first section 4111 which has been etched three times, a second section 4112 which has been etched twice, a third section 4113 which has been etched once and a fourth section 4114 which is not etched. In this way, a terraced structure is obtained. Assuming that the first section 4111 has a thickness T1, the second section 4112 has a thickness T2, the third section 4113 has a thickness T3 and the fourth section has a thickness T4, the relation between those thicknesses is T1<T2<T3<T4.

The (111) plane, which is slowly etchable, is exposed at boundaries respectively between the first section 4111 and the second section 4112, the second section 4112 and the third section 4113, and the third section 4113 and the fourth section 4114.

Figure 9G:
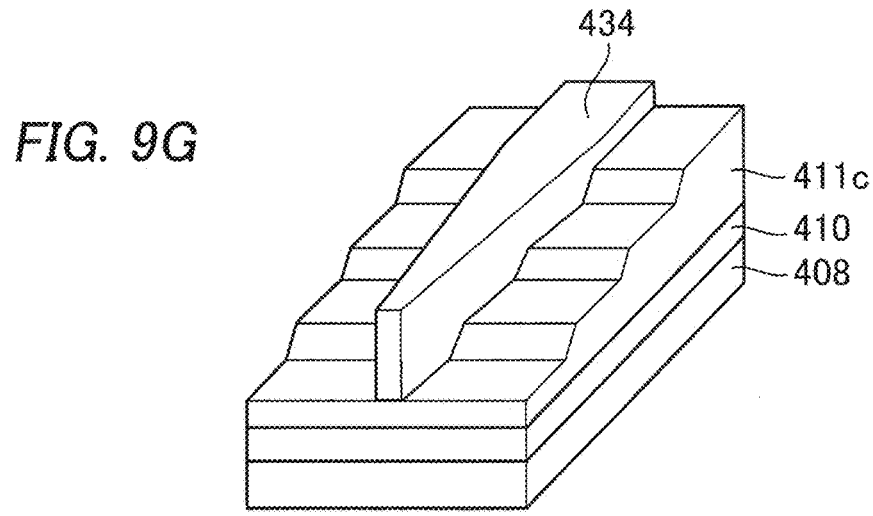

In turn, in the second step shown in FIG. 9G, a photoresist 434 is formed on the terraced single-crystalline film 411c to cover portions which will be an Si thin line optical waveguide having its width constant and the core of the spot-size converter. More specifically, photolithography applicable to processing a Si electronic device is conducted to form a pattern on a section having its width constant and a tapered section having its width gradually varying.

Figure 9H:
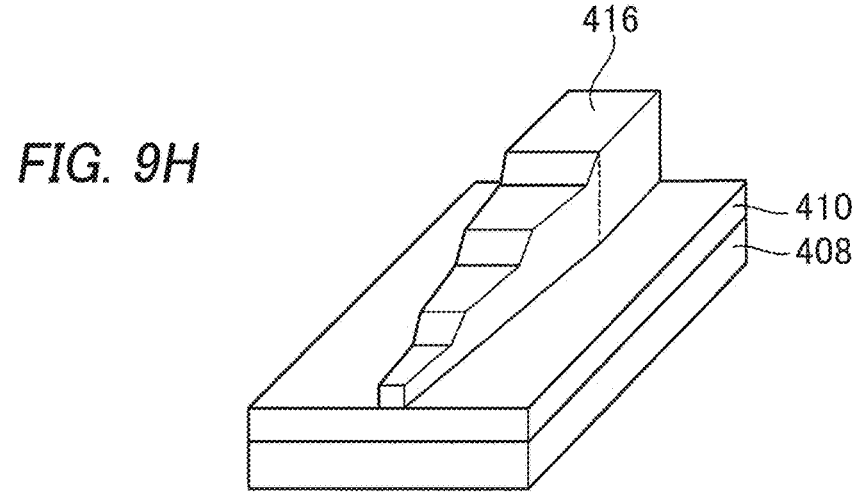

Then, in the third step shown in FIG. 9H, dry etching is performed by using the photoresist 434 as etching mask. Consequently, the single-crystalline film 411 is patterned into the Si thin line optical waveguide and the core of the spot-size converter. After the pattern is formed by the dry etching, the photoresist 434 is removed.

Figure 9I:
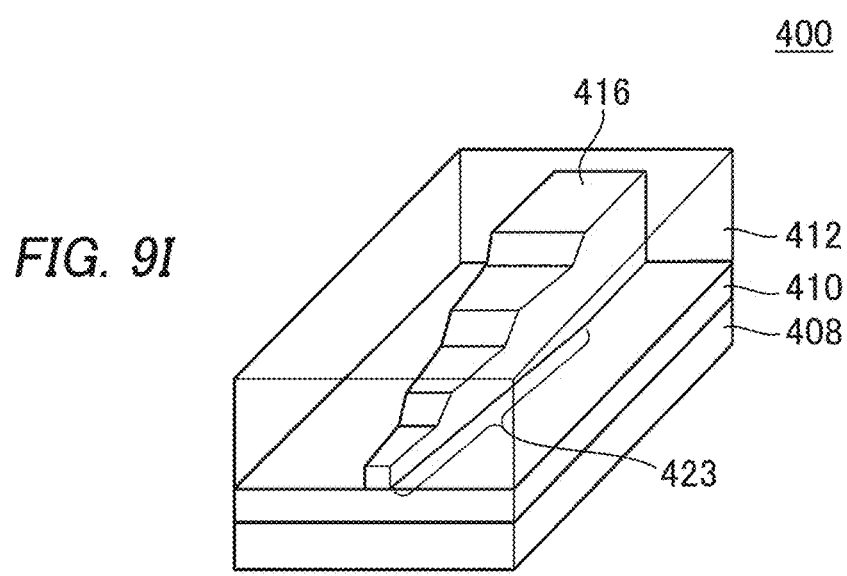

In the subsequent fourth step shown in FIG. 9I, the structure obtained after having the photoresist removed is coated to form an $SiO_2$ layer serving as an upper cladding 412. The upper cladding 412 is formed by a CVD (Chemical Vapor Deposition) according to a general method in this embodiment. Alternatively, the $SiO_2$ layer serving as the upper cladding 412 may be formed by means of vacuum deposition, sputtering deposition or flame hydrolysis deposition.

Configuration and Operation of Spot-Size Converter of Third Embodiment

Figure 10:
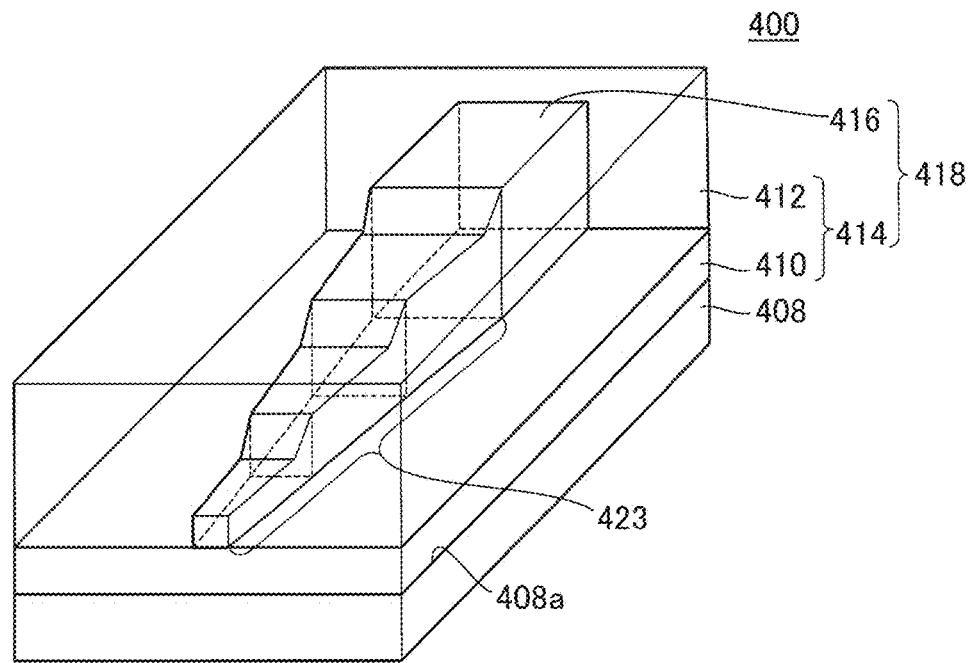
FIG. 10 schematically illustrates, in a perspective view, the configuration of the spot-size converter of the third embodiment.
Figure 11:
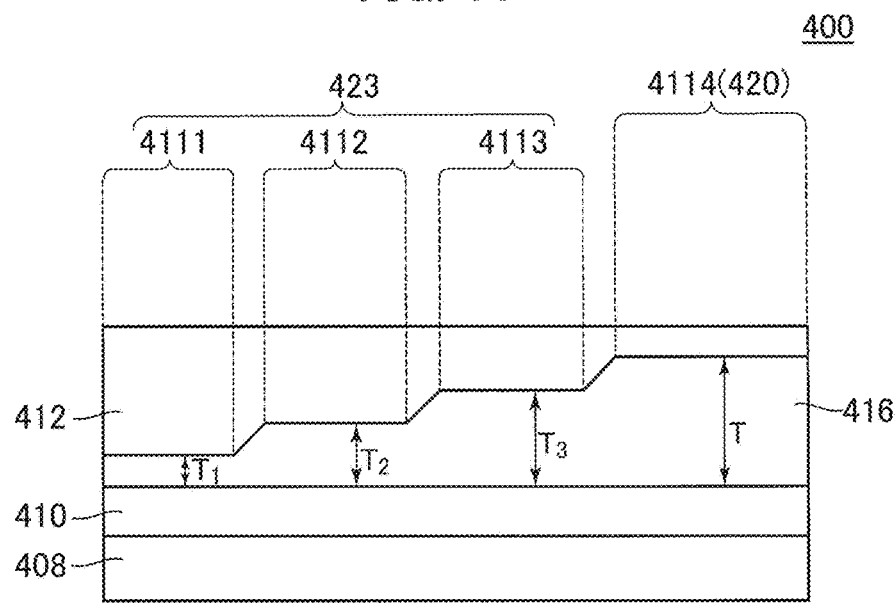
FIG. 11 is a side elevation of the spot-size converter shown in FIG. 10.
Figure 12:
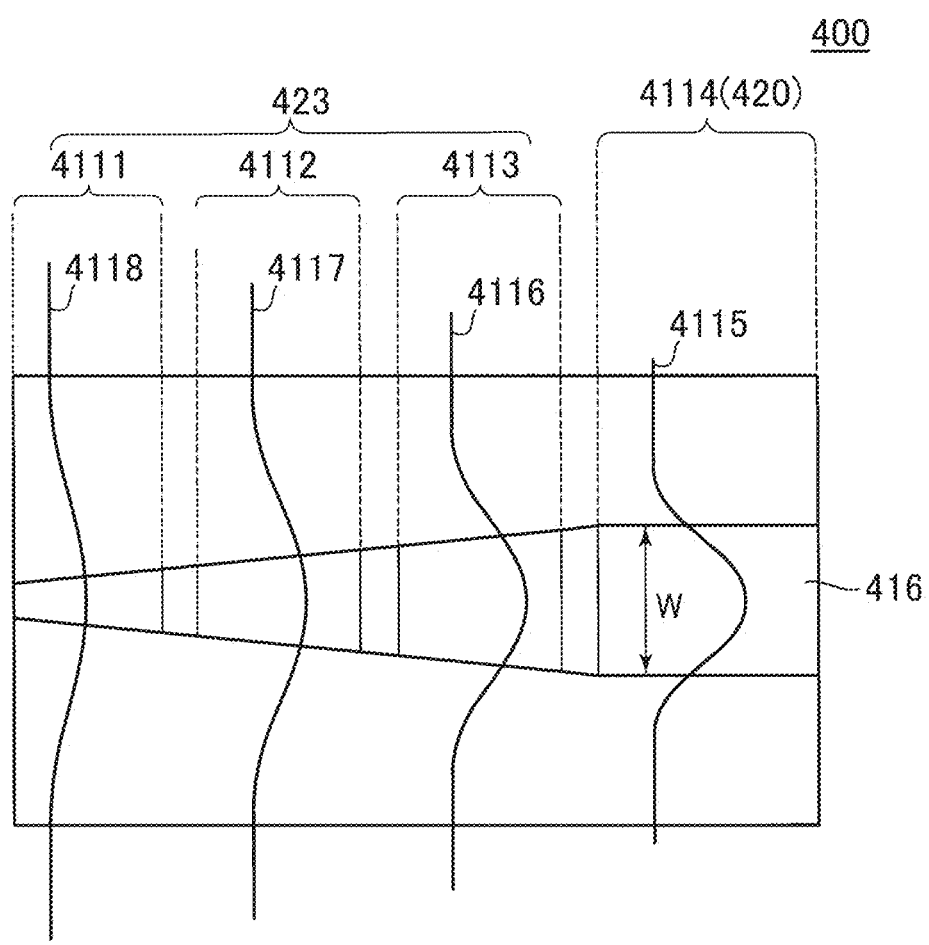
FIG. 12 is a plane view of the converter shown in FIG. 10.

Next, the spot-size converter of the third illustrative embodiment will be described by referring to FIGS. 10 to 12. FIG. 10 substantially shows in a perspective view the configuration of the spot-size converter 400 of the third illustrative embodiment. FIG. 11 is a side elevation of the spot-size converter shown in FIG. 10. FIG. 12 is a plan view of the converter shown in FIG. 10.

Note that, although the core which composes the spot-size converter would not visible in FIGS. 10 to 12 since it is actually hidden in the cladding, it is depicted by a solid line in order to grasp the entire structure of the device.

The spot-size converter 400 of the third illustrative embodiment has an optical waveguide 418 provided over the principal surface 408a of the substrate 408. The optical waveguide 418 has a core 416 and a cladding 414. The core 416 in this example is composed of single-crystalline Si substantially having a diamond lattice structure. The core 416 herein conceptually denotes the structure as a whole composed of single-crystalline Si.

The cladding 414 has a lower cladding 410 and an upper cladding 412. In this example, both of the upper and lower claddings 412 and 410 are composed of $SiO_2$. As described above, the optical waveguide 418 is configured as a Si optical waveguide, having the core 416 made of Si and the cladding 414 made of $SiO_2$. However, the materials of the core 416 and the cladding 414 may not be restricted thereto. The cladding 414 may be composed of a material having its refractive index smaller than that of Si. For instance, in the case of applying light of 1.55 μm in wavelength, the cladding can be composed of, such as, $Si_3N_4$ with a refractive index of 1.989.

The light propagating part 420 is a channel-type optical waveguide configured by the core body and the surrounding cladding. The core body configuring the light propagating part 420 has a square transverse cross section. In more detail, each of the height T and the width W of the core body in this example is approximately 0.3 μm. The core body has its top face 424a lying herein in parallel with the principal surface 408a and configured by the (100) plane.

The transverse cross section of the core body thus formed in a square renders the light propagating part 420 polarization-independent. Also by adjusting the height T and the width W in the range from 0.2 to 0.5 μm, the light propagating part 420 now allows a beam of light of approximately 1.55 μm in wavelength, predominantly for use in the next-generation PON, to be transmitted therethrough in a single mode both in the height-wise and width-wise directions.

Referring now to FIGS. 11 and 12, the light input/output part 423 is an optical waveguide configured by the core 416 having a structure suitable for spot size conversion fabricated therein, and the surrounding cladding 414.

The light input/output part 423 has its planar shape tapered in width which is narrowed gradually from the light propagating part 420 towards the light input/output end. In addition, the light input/output part 423 is configured in the terraced pattern in which the thicknesses T, T3, T2 and T1 get thinner from the light propagating part 420 towards the light input/output end.

Moreover, the boundary planes between the first to fourth regions 4111 to 4114 formed in the terraced pattern are the (111) plane formed in the tapered pattern.

Next, the operation of the spot-size converter 400 of the third illustrative embodiment will be described by referring to FIG. 12. A light beam propagating through the light propagating part 420 is coupled to the light input/output part 423. As described above, the light input/output part 423 gets narrower gradually from the light propagating part 420 towards the light input/output end in the direction of light propagation, and gets thinner stepwise. That configuration enables the cross-section of the core 416 of the spot-size converter 400 of the third embodiment to be kept in the shape close to a square.

Therefore, proper control of the size of the cross-section of the core 416 of the spot-size converter 400 of the third embodiment allows the difference in propagation constants between the TE-polarized light and the TM-polarized light to be reduced. As a consequence, the cross-section of the core 416 of the spot-size converter 400 of the third embodiment decreases from the light propagating part 420 towards the light input/output end irrespective of TE-polarized light or TM-polarized light waveguide mode. This means that the equivalent refractive index for the propagating light beam gradually decreases as the light beam approaches the light input/output end. As the equivalent refractive index gets smaller, the ability of light confinement into the core 416 decreases, so that the propagating light beam will more widely spread outward from the core 416 as the light beam propagates further in the direction of propagation through the light input/output part 423. In other words, the spot size of the propagating light beam becomes larger as the light beam propagates further towards the output end. How the light beam spreads outwardly is conceptually plotted with curves 4115-4118 in FIG. 12.

Advantages of Spot-Size Converter of Third Embodiment

Since the cross-section of the core 416 of the spot-size converter 400 of the third embodiment can be maintained in the shape close to a square, the spot-size converter 400 can perform a conversion irrespective of TE-polarized light or TM-polarized light, i.e. in a polarization-independent manner.

In addition to that, since the anisotropic etching according to the wet etching is conducted in the direction of thickness of the spot-size converter, the degree of the etching can be controlled with high accuracy, thereby realizing good product yield.

Furthermore, when the terraced structure is formed by the wet etching, the side faces corresponding to the boundaries between the steps are formed into the (111) planes, which are etchable slowly, and will have the tapered shape. Such a shape can suppress the scattering of light better than a nearly vertical shape formed by the dry etching.

Grating Coupler

Figure 13A:
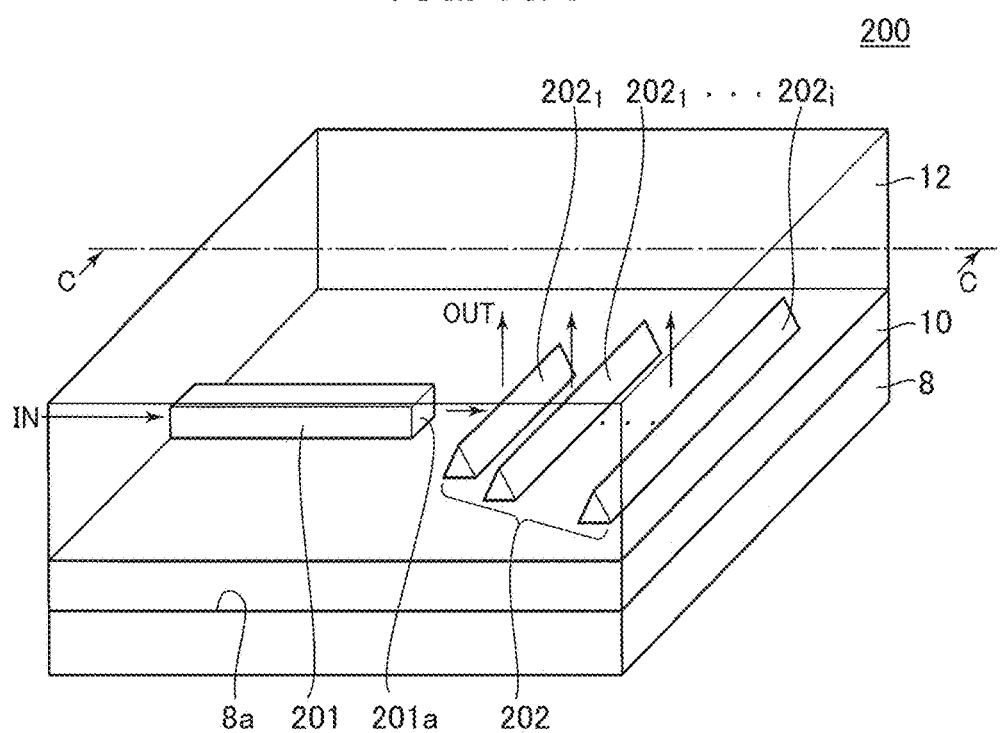
FIG. 13A schematically illustrates, in a perspective view, the configuration of a grating coupler.
Figure 13B:
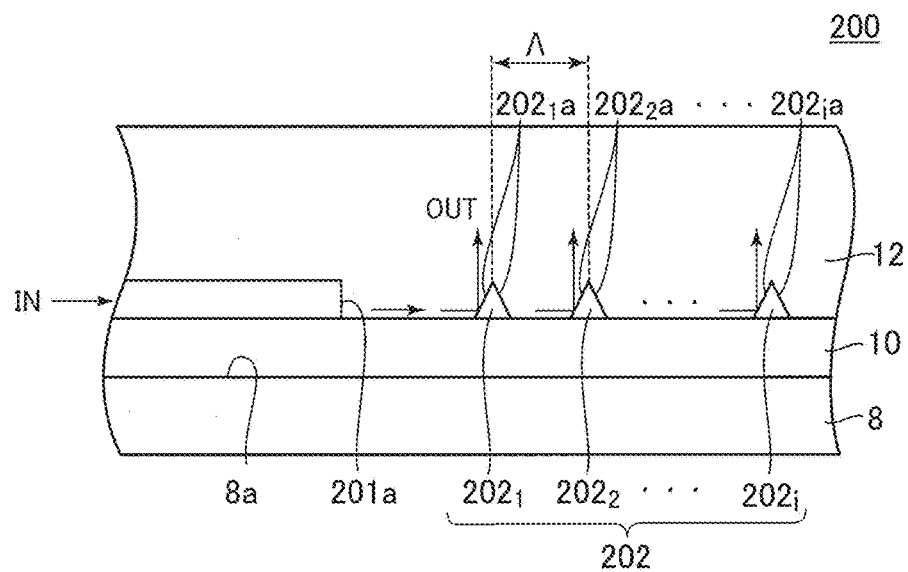
FIG. 13B is an end elevation taken along line C-C in FIG. 13A.

Next, a grating coupler, as one example of optical device, will be described referring to FIGS. 13A and 13B. FIG. 13A schematically shows in a perspective view the configuration of a grating coupler 200. FIG. 13B is an end elevation taken along line C-C in FIG. 13A.

The grating coupler 200 thus shown has an optical waveguide 201 through which an input light beam IN propagates, and a light input/output part 202.

The optical waveguide 201 is a channel-type optical waveguide having a rectangular transverse cross section, and has an input/output end 201a through which a light beam is input or output.

The light input/output part 202 has a plurality of linear cores $202_1$, $202_2$, ..., $202_i$, where i represents an integer more than two, disposed substantially in parallel to each other so as to cross the direction of propagation of input light IN. The cores $202_1$, $202_2$, ..., $202_i$ are disposed at a predetermined period or pitch A.

The cores $202_1$, $202_2$, ..., $202_i$ have the cross sectional shape thereof, taken substantially perpendicularly to the direction of propagation of the input light beam IN, and given by an isosceles triangle with the two equal sides configured by the (111) planes $202_1a, 202_2a, \ldots, 202_ia$.

Next, the method of manufacturing the grating coupler 200 will be briefed. On the SOI substrate 13 in which the (100) plane is exposed to the surface 11a of the single-crystalline film 11, FIG. 1A, the single-crystalline film 11 is patterned into the precursors of the cores and the optical waveguide 201, all having rectangular cross sections. A resist pattern is then formed so as to expose only the precursors of the cores $202_1, 202_2, \ldots, 202_i$, and the structure is wet-etched with an alkaline solution. By the etching, the {111} planes expose on both side faces of the precursors of the cores as the etch-stop planes, and thereby the cores $202_1, 202_2, \ldots, 202_i$ having an isosceles triangular cross sectional shape are obtained. Lastly the upper cladding 12 is formed to obtain the grating coupler 200.

Now, the operation of the grating coupler 200 will be described, mainly referring to FIG. 13B. The input light beam IN emitted from the input/output end 201a of the optical waveguide 201 substantially in parallel to the principal surface 8a of the substrate 8 is reflected on the (111) planes $202_1a, 202_2a, \ldots, 202_ia$, at angles associated with the period A of the cores $202_1, 202_2, \ldots, 202_i$, upwardly above the principal surface 8a, and extracted as the output light beam OUT.

By virtue of the isosceles triangular cross sectional shape of the cores $202_1, 202_2, \ldots, 202_i$, the grating coupler 200 can efficiently reflect the input light beam IN upwardly above the principal surface 8a. Accordingly, the grating coupler 200 will have an improved extraction efficiency of output light beam OUT, as compared with a grating coupler having cores with a rectangular cross section on which the input light beam IN would be reflected into both directions, that is, upside and downside of the cores.

The cross sectional shape of the cores $202_1, 202_2, \ldots, 202_i$ may alternatively be an isosceles trapezoid with the two equal legs configured by the (111) planes.

Polarization Converter

Figure 14A:
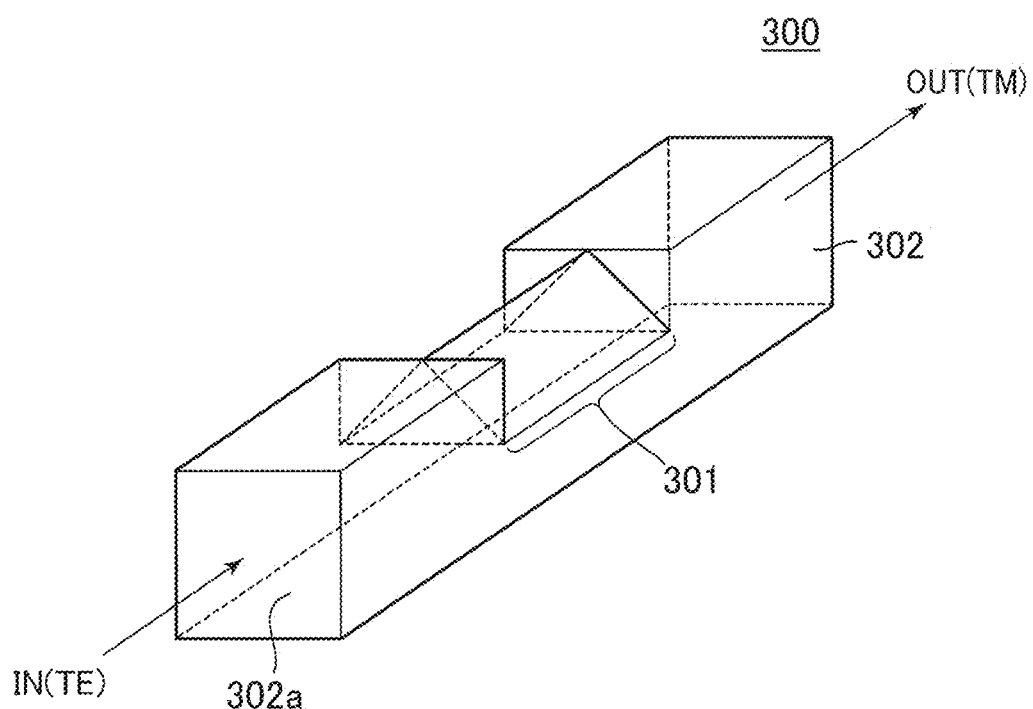
FIG. 14A schematically illustrates, in a perspective view, the configuration of a polarization converter.
Figure 14B:
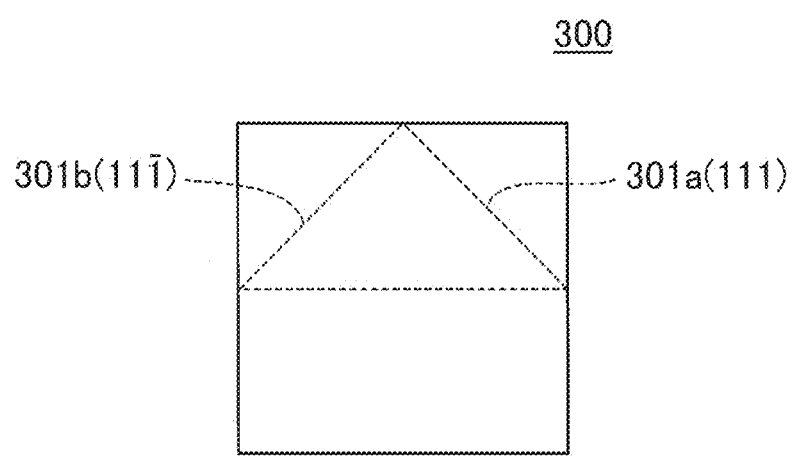
FIG. 14B is an end elevation of the polarization converter shown in FIG. 14A viewed from the direction of its light input/output end.

Next, a polarization converter as one example of the optical device will be described, referring to FIGS. 14A and 14B. FIG. 14A schematically shows in a perspective view the configuration of a polarization converter 300. FIG. 14B is an end elevation of the polarization converter shown in FIG. 14A as viewed from the direction of a light input/output end 302a. In the figures, the cladding and the substrate are not illustrated.

The polarization converter 300 has a core 302 through which the input light beam IN propagates, and a polarization conversion part 301 which takes part in polarization conversion of the propagating light.

The polarization conversion part 301 has its transverse cross sectional shape that is an isosceles triangle having its equal sides 301a and 301b configured by the (111) and (11-1) planes, respectively.

The core 302 forms a channel-type optical waveguide having a square transverse cross section. The polarization conversion part 301 is formed as part of the core 302. The core 302 also has a light input/output end 302a through which the light beam is input or output.

Now, the method of manufacturing the polarization converter 300 will be briefed. On the SOI substrate 13 in which the (100) plane is exposed to the surface 11a of the single-crystalline film 11, FIG. 1, the single-crystalline film 11a is patterned into the core 302 so as to have a square cross section. A resist pattern is then formed so as to expose only a part of the core 302, which will be processed into the polarization conversion part 301, and the structure is wet-etched with an alkaline solution. By the etching, the (111) planes expose as the etch-stop planes in the region where the core 302 exposes, and the polarization conversion part 301 with an isosceles triangular cross section is thereby obtained. Lastly the cladding is formed to obtain the polarization converter 300.

Next, the operation of the polarization converter 300 will be described, mainly referring to FIG. 14A. For example, upon input of TE-polarized light as the input light beam IN from the light input/output end 302a, the light propagates through the core 302 to reach the polarization conversion part 301, where the refractive index distributes asymmetrically in the transverse cross section. By virtue of the asymmetrical distribution of refractive index, both polarized waves cause different propagation constants in the polarization conversion part 301. Making use of the difference in propagation constants, the TE-polarized light as the input light beam IN is converted into the TM-polarized light, and then output as the output light beam OUT.

In this way, the polarization converter 300 attains polarization conversion only with a simple configuration.

The cross sectional shape of the polarization conversion part 301 may alternatively be an isosceles trapezoid with the two equal legs configured by the (111) planes.

According to the manufacturing method of the present invention, the optical device which contains a Si optical waveguide may be manufactured by simplified steps, with dimensional variation being suppressed. As a consequence, the yield of manufacturing of the optical device may be improved.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

The entire disclosure of Japanese patent application Nos. 2013-196083 and 2014-124662 filed on Sep. 20, 2013 and Jun. 17, 2014, respectively, including the specification, claims, accompanying drawings and abstract of the disclosure, is incorporated herein by reference in its entirety.

What is claimed is:

1. An optical device comprising an optical waveguide provided on a principal surface of a substrate, said optical waveguide comprising:
   a core formed by patterning a single-crystalline film which has constituent atoms substantially forming a diamond lattice structure and has a surface being neither a (111) plane nor an equivalent plane to the (111) plane;
   a first cladding formed by covering the core with a substance having a refractive index smaller than 71.4% of the refractive index of the core; and
   a light input/output part through which a light beam is input or output,
   the light input/output part having two or more planes selected from a (111) plane and an equivalent plane to the (111) plane, which expose as etch-stop planes when a precursor tapered in width toward an end portion of the light input/output part is wet etched using an alkaline solution, and the core having two planes substantially non-parallel to each other among the (111) plane and the equivalent plane.

2. The optical device according to claim 1, wherein the connective part has a plurality of sub-connective parts arrayed in series in a direction of light propagation,
   each of the sub-connective parts having a sub-connective plane as a slope, and a sub-plane connected to the sub-connective plane and having a same plane orientation as a top face of the core,
   the sub-connective planes having the same plane orientation for all of the plurality of sub-connective parts, and being configured to shrink stepwise in area in the direction of light propagation.

3. The optical device according to claim 1, wherein the light input/output part has an end portion truncated substantially perpendicularly to a direction of light propagation, ensuring a size of cross section capable of allowing both of TE wave and TM wave to propagate therethrough.

4. The optical device according to claim 1, wherein the light input/output part has provided therearound with a second cladding having a refractive index substantially larger than that of the first cladding and substantially smaller than that of the core,
   the first cladding extending around the second cladding.

5. The optical device according to claim 1, wherein the precursor before wet-etching has a uniform thickness.

* * * * *